(12) United States Patent
Anantharamaiah et al.

(10) Patent No.: US 11,123,668 B2
(45) Date of Patent: *Sep. 21, 2021

(54) FILTER MEDIA INCLUDING A FILTRATION LAYER COMPRISING SYNTHETIC FIBERS

(71) Applicant: Hollingsworth & Vose Company, East Walpole, MA (US)

(72) Inventors: Nagendra Anantharamaiah, Mysore (IN); Sudhakar Jaganathan, Northborough, MA (US); Gerald Gadbois, Westfield, MA (US); Maxim Silin, Hudson, MA (US); Mark A. Gallimore, Floyd, VA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,428

(22) Filed: Feb. 21, 2019

(65) Prior Publication Data

US 2019/0321760 A1 Oct. 24, 2019

Related U.S. Application Data

(63) Continuation of application No. 15/045,538, filed on Feb. 17, 2016, now Pat. No. 10,252,200.

(51) Int. Cl.
*B01D 39/16* (2006.01)

(52) U.S. Cl.
CPC ........ *B01D 39/1623* (2013.01); *B01D 39/163* (2013.01); *B01D 2239/065* (2013.01);
(Continued)

(58) Field of Classification Search
CPC .............. B01D 39/1623; B01D 39/163; B01D 46/0001; B01D 46/0023; B01D 46/10;
(Continued)

(56) References Cited

U.S. PATENT DOCUMENTS

| 3,613,678 A | 10/1971 | Mayhew |
| 3,682,282 A | 8/1972 | Carboni et al. |

(Continued)

FOREIGN PATENT DOCUMENTS

| CA | 2051774 A1 | 3/1992 |
| CA | 2187586 A1 | 4/1997 |

(Continued)

OTHER PUBLICATIONS

International Search Report and Written Opinion for Application No. PCT/US2017/018186 dated Apr. 25, 2017.
(Continued)

*Primary Examiner* — Jason M Greene
(74) *Attorney, Agent, or Firm* — Wolf, Greenfield & Sacks, P.C.

(57) ABSTRACT

Filter media comprising a filtration layer comprising synthetic fibers (e.g., pleatable backer layer) and related components, systems, and methods associated herewith are provided. In some embodiments, the filtration layer comprising synthetic fibers may be a non-woven web comprising a blend of coarse and fine diameter fibers. The filtration layer comprising synthetic fibers may be designed to have desirable performance properties without compromising certain mechanical properties, such as the pleatability of the media. In some embodiments, a filter media, described herein, may comprise the filtration layer comprising synthetic fibers and an efficiency layer. Filter media, as described herein, may be particularly well-suited for applications that involve filtering air, though the media may also be used in other applications.

20 Claims, 5 Drawing Sheets

(52) U.S. Cl.
CPC ............... *B01D 2239/0636* (2013.01); *B01D 2239/1233* (2013.01); *B01D 2239/1291* (2013.01)

(58) Field of Classification Search
CPC ...... B01D 2239/0636; B01D 2239/065; B01D 2239/1233; B01D 2239/1291
See application file for complete search history.

(56) References Cited

U.S. PATENT DOCUMENTS

| | | |
|---|---|---|
| 3,789,047 A | 1/1974 | Pruckmayr |
| 3,808,289 A | 4/1974 | Okuhashi et al. |
| 3,816,212 A | 6/1974 | O'Brien |
| 3,862,282 A | 1/1975 | Watson |
| 3,877,974 A | 4/1975 | Mischutin |
| 4,033,936 A | 7/1977 | Bollert et al. |
| 4,041,203 A | 8/1977 | Brock et al. |
| 4,093,437 A | 6/1978 | Ichihara et al. |
| 4,126,560 A | 11/1978 | Marcus et al. |
| 4,131,594 A | 12/1978 | Nakamura et al. |
| 4,147,574 A | 4/1979 | Setsuie et al. |
| 4,200,488 A | 4/1980 | Brandon et al. |
| 4,426,417 A | 1/1984 | Meitner et al. |
| 4,589,894 A | 5/1986 | Gin et al. |
| 4,774,125 A | 9/1988 | McAmish |
| 4,775,579 A | 10/1988 | Hagy et al. |
| 4,891,262 A | 1/1990 | Nakamae et al. |
| 4,957,795 A | 9/1990 | Riedel |
| 4,961,974 A | 10/1990 | Jones |
| 4,992,327 A | 2/1991 | Donovan et al. |
| 5,026,587 A | 6/1991 | Austin et al. |
| 5,108,827 A | 4/1992 | Gessner |
| 5,273,565 A | 12/1993 | Milligan et al. |
| 5,288,402 A | 2/1994 | Yoshida |
| 5,336,286 A | 8/1994 | Alexander et al. |
| 5,397,632 A | 3/1995 | Murphy et al. |
| 5,419,953 A | 5/1995 | Chapman |
| 5,437,922 A | 8/1995 | Jackson et al. |
| 5,447,788 A | 9/1995 | Rhim et al. |
| 5,472,600 A | 12/1995 | Ellefson et al. |
| 5,480,466 A | 1/1996 | Jackson et al. |
| 5,503,907 A | 4/1996 | Gessner et al. |
| 5,505,719 A | 4/1996 | Cohen et al. |
| 5,580,459 A | 12/1996 | Powers et al. |
| 5,607,491 A | 3/1997 | Jackson et al. |
| 5,650,898 A | 7/1997 | Atkinson et al. |
| 5,672,399 A | 9/1997 | Kahlbaugh et al. |
| 5,685,897 A | 11/1997 | Belding et al. |
| 5,698,298 A | 12/1997 | Jackson et al. |
| 5,709,735 A | 1/1998 | Midkiff et al. |
| 5,713,601 A | 2/1998 | Boenigk |
| 5,785,725 A | 7/1998 | Cusick et al. |
| 5,817,584 A | 10/1998 | Singer et al. |
| 5,820,645 A | 10/1998 | Murphy |
| 5,851,355 A | 12/1998 | Goettmann |
| 5,885,909 A | 3/1999 | Rudisill et al. |
| 5,935,884 A | 8/1999 | Williams et al. |
| 5,948,344 A | 9/1999 | Cusick et al. |
| 5,972,434 A | 10/1999 | Kajander |
| 5,993,501 A | 11/1999 | Cusick et al. |
| 5,994,615 A | 11/1999 | Dodge, II et al. |
| 6,156,680 A | 12/2000 | Goettmann |
| 6,169,045 B1 | 1/2001 | Pike et al. |
| 6,171,443 B1 | 1/2001 | Goettmann et al. |
| 6,171,684 B1 | 1/2001 | Kahlbaugh et al. |
| 6,254,653 B1 | 7/2001 | Choi et al. |
| 6,315,805 B1 | 11/2001 | Strauss |
| 6,336,948 B1 | 1/2002 | Inoue et al. |
| 6,419,839 B1 | 7/2002 | Cox et al. |
| 6,468,651 B2 | 10/2002 | Aikawa et al. |
| 6,485,811 B1 | 11/2002 | Horiguchi et al. |
| 6,554,881 B1 | 4/2003 | Healey |
| 6,579,350 B2 | 6/2003 | Doherty |
| 6,649,547 B1 | 11/2003 | Arnold et al. |
| 6,670,522 B1 | 12/2003 | Graef et al. |
| 6,746,571 B1 | 6/2004 | Scheinberg |
| 6,758,878 B2 | 7/2004 | Choi et al. |
| 6,802,315 B2 | 10/2004 | Gahan et al. |
| 6,858,057 B2 | 2/2005 | Healey et al. |
| 6,878,427 B2 | 4/2005 | Schmidt et al. |
| 6,966,939 B2 | 11/2005 | Rammig et al. |
| 7,008,465 B2 | 3/2006 | Graham et al. |
| 7,137,510 B1 | 11/2006 | Klein et al. |
| 7,153,793 B2 | 12/2006 | Willis et al. |
| 7,309,372 B2 | 12/2007 | Kahlbaugh et al. |
| 7,314,497 B2 | 1/2008 | Kahlbaugh et al. |
| 7,441,667 B2 | 10/2008 | Galvin et al. |
| 7,452,831 B2 | 11/2008 | Yamada et al. |
| 7,498,281 B2 | 3/2009 | Iwasaki et al. |
| 7,819,936 B2 | 10/2010 | Kohli et al. |
| 7,833,918 B2 | 11/2010 | Gormley et al. |
| 7,922,959 B2 | 4/2011 | Jones et al. |
| 7,942,948 B2 | 5/2011 | Smithies et al. |
| 7,989,371 B2 | 8/2011 | Angadjivand et al. |
| 7,994,079 B2 | 8/2011 | Chen et al. |
| 8,057,567 B2 | 11/2011 | Webb et al. |
| 8,062,565 B2 | 11/2011 | Mueller et al. |
| 8,083,828 B2 | 12/2011 | Smith et al. |
| 8,410,005 B2 | 4/2013 | Brennan et al. |
| 8,512,432 B2 | 8/2013 | Jones et al. |
| 8,512,569 B2 | 8/2013 | Eaton et al. |
| 8,668,758 B2 | 3/2014 | Duello et al. |
| 8,951,338 B2 | 2/2015 | Matsuda et al. |
| 8,986,432 B2 | 3/2015 | Wertz et al. |
| 10,252,200 B2 * | 4/2019 | Anantharamaiah .......................... B01D 39/1623 |
| 10,293,290 B2 | 5/2019 | Demmel et al. |
| 2002/0026166 A1 | 2/2002 | Graef et al. |
| 2002/0037679 A1 | 3/2002 | Bansal et al. |
| 2002/0083837 A1 | 7/2002 | Doherty |
| 2003/0113509 A1 | 6/2003 | Lugg |
| 2003/0186609 A1 | 10/2003 | Booker |
| 2003/0192293 A1 | 10/2003 | Choi et al. |
| 2003/0203696 A1 | 10/2003 | Healey |
| 2004/0058609 A1 | 3/2004 | Bansal et al. |
| 2004/0102112 A1 | 5/2004 | McGuire et al. |
| 2004/0116028 A1 | 6/2004 | Bryner |
| 2004/0121114 A1 | 6/2004 | Piana et al. |
| 2004/0192146 A1 | 9/2004 | Sturgill |
| 2004/0242107 A1 | 12/2004 | Collins |
| 2005/0039836 A1 | 2/2005 | Dugan et al. |
| 2005/0136772 A1 | 6/2005 | Chen et al. |
| 2005/0138906 A1 | 6/2005 | Kubokawa et al. |
| 2005/0148261 A1 | 7/2005 | Close et al. |
| 2005/0241745 A1 | 11/2005 | Bansal |
| 2006/0068675 A1 | 3/2006 | Handermann et al. |
| 2006/0096932 A1 | 5/2006 | Dema et al. |
| 2006/0116043 A1 | 6/2006 | Hope et al. |
| 2006/0117730 A1 | 6/2006 | Chung et al. |
| 2006/0137317 A1 | 6/2006 | Bryner et al. |
| 2006/0144024 A1 | 7/2006 | Sauer et al. |
| 2006/0292947 A1 | 12/2006 | Lavietes et al. |
| 2007/0023958 A1 | 2/2007 | LaVietes et al. |
| 2007/0026753 A1 | 2/2007 | Neely et al. |
| 2007/0141931 A1 | 6/2007 | Nandi et al. |
| 2007/0141936 A1 | 6/2007 | Bunyard et al. |
| 2007/0166540 A1 | 7/2007 | Baba et al. |
| 2007/0220852 A1 | 9/2007 | Lifshutz et al. |
| 2007/0227359 A1 | 10/2007 | Choi |
| 2007/0270071 A1 | 11/2007 | Greer et al. |
| 2007/0039300 A1 | 12/2007 | Kahlbaugh et al. |
| 2008/0011303 A1 | 1/2008 | Angadjivand et al. |
| 2008/0022643 A1 | 1/2008 | Fox et al. |
| 2008/0078152 A1 | 4/2008 | Smithies |
| 2008/0120954 A1 | 5/2008 | Duello et al. |
| 2008/0202078 A1 | 8/2008 | Healey et al. |
| 2008/0236722 A1 | 10/2008 | Charbonneau et al. |
| 2008/0315465 A1 | 12/2008 | Smithies et al. |
| 2009/0019825 A1 | 1/2009 | Skirius et al. |
| 2009/0077938 A1 | 3/2009 | Kume et al. |
| 2009/0117801 A1 | 5/2009 | Flack |
| 2009/0120048 A1 | 5/2009 | Wertz et al. |
| 2009/0288558 A1 | 11/2009 | Duello et al. |

(56) References Cited

U.S. PATENT DOCUMENTS

| | | |
|---|---|---|
| 2009/0324947 A1 | 12/2009 | Nishitani et al. |
| 2010/0000411 A1 | 1/2010 | Wertz et al. |
| 2010/0006498 A1 | 1/2010 | Duello et al. |
| 2010/0028638 A1 | 2/2010 | Reichardt et al. |
| 2010/0083838 A1 | 4/2010 | Togashi |
| 2010/0146921 A1 | 6/2010 | Takano et al. |
| 2010/0151760 A1 | 6/2010 | Laura, Jr. et al. |
| 2010/0187171 A1 | 7/2010 | Gupta |
| 2010/0212272 A1 | 8/2010 | Sealey et al. |
| 2010/0272938 A1 | 10/2010 | Mitchell et al. |
| 2010/0300132 A1 | 12/2010 | Schultz et al. |
| 2011/0064928 A1 | 3/2011 | Bonneh |
| 2011/0084017 A1 | 4/2011 | Pocher et al. |
| 2011/0162778 A1 | 7/2011 | Suzuka et al. |
| 2011/0196327 A1 | 8/2011 | Chhabra et al. |
| 2011/0274869 A1 | 11/2011 | Bernhard et al. |
| 2012/0048797 A1 | 3/2012 | Smith et al. |
| 2012/0116338 A1 | 5/2012 | Ferry et al. |
| 2012/0152824 A1 | 6/2012 | Cox et al. |
| 2012/0234748 A1 | 9/2012 | Little et al. |
| 2012/0295165 A1 | 11/2012 | Morin et al. |
| 2013/0143020 A1 | 6/2013 | Wood et al. |
| 2013/0244527 A1 | 9/2013 | Sarzotti et al. |
| 2013/0330994 A1 | 12/2013 | Stoll |
| 2013/0340962 A1 | 12/2013 | Gupta et al. |
| 2014/0083066 A1 | 3/2014 | Bahukudumbi et al. |
| 2014/0083926 A1 | 3/2014 | Winters et al. |
| 2014/0120322 A1 | 5/2014 | Fu et al. |
| 2014/0123613 A1 | 5/2014 | Le Port et al. |
| 2014/0305090 A1 | 10/2014 | Kuroda et al. |
| 2014/0331626 A1 | 11/2014 | Nagy et al. |
| 2014/0360146 A1 | 12/2014 | Cambo et al. |
| 2015/0182885 A1 | 7/2015 | Thomson et al. |
| 2015/0273372 A1 | 10/2015 | Demmel et al. |
| 2015/0375150 A1 | 12/2015 | Sahbaee et al. |
| 2016/0166961 A1 | 6/2016 | Haberkamp et al. |
| 2016/0175752 A1 | 6/2016 | Jaganathan et al. |
| 2016/0206984 A1 | 7/2016 | Berrigan et al. |
| 2016/0279548 A1 | 9/2016 | Chavan et al. |
| 2017/0225104 A1 | 8/2017 | Peters et al. |
| 2017/0232371 A1 | 8/2017 | Anantharamaiah et al. |
| 2017/0232372 A1 | 8/2017 | Zhang et al. |

FOREIGN PATENT DOCUMENTS

| | | |
|---|---|---|
| CN | 1401407 A | 3/2003 |
| CN | 101797457 A | 8/2010 |
| CN | 102942750 A | 2/2013 |
| EP | 0 598 536 B1 | 6/1998 |
| EP | 0 729 375 B1 | 4/1999 |
| EP | 2 138 634 B1 | 8/2012 |
| EP | 2 865 434 A1 | 4/2015 |
| GB | 1 363 650 A | 8/1974 |
| JP | H07-136066 A | 5/1995 |
| JP | 2006-136809 A | 6/2006 |
| JP | 2009-275319 A | 11/2009 |
| JP | 2011-137267 A | 7/2011 |
| WO | WO 02/13942 A1 | 2/2002 |
| WO | WO 2007/061423 A2 | 5/2007 |
| WO | WO 2008/085545 A2 | 7/2008 |
| WO | WO 2010/010234 A1 | 1/2010 |
| WO | WO 2012/051056 A1 | 4/2012 |

OTHER PUBLICATIONS

International Search Report and Written Opinion for PCT/US2017/054340 dated Jan. 26, 2018.

Didane et al., Thermal and fire resistance of fibrous materials made by PET containing flame retardant agents. Polymer Degradation and Stability. 2012;97:2545-51.

Horrocks, Flame retardant challenges for textiles and fibres: New chemistry versus innovatory solutions. Polymer Degradation and Stability. 2011;96:377-92.

U.S. Appl. No. 15/283,014, filed Sep. 30, 2016, Zhang et al.

PCT/US2017/018186, Apr. 25, 2017, International Search Report and Written Opinion.

PCT/US2017/054340, Jan. 26, 2018, International Search Report and Written Opinion.

* cited by examiner

US 11,123,668 B2

FILTER MEDIA INCLUDING A FILTRATION LAYER COMPRISING SYNTHETIC FIBERS

RELATED APPLICATIONS

This application is a continuation of U.S. application Ser. No. 15/045,538 filed Feb. 17, 2016, which is incorporated herein by reference in its entirety.

FIELD OF INVENTION

The present embodiments relate generally to filter media including a filtration layer comprising synthetic fibers, and specifically, to filter media having enhanced filtration properties.

BACKGROUND

Various filter media can be used to remove contamination in a number of applications. Filter media may be designed to have different performance characteristics, depending on their desired use. For example, relatively lower efficiency filter media may be used for heating, ventilating, refrigerating, air conditioning applications. For applications that demand different performance characteristics (e.g., very high efficiency), such as for clean rooms or biomedical applications, high efficiency particulate air (HEPA) or ultra-low penetration air (ULPA) filters may be used.

Filter media can be used to remove contamination in a variety of applications. In general, filter media include one or more fiber webs. The fiber web provides a porous structure that permits fluid (e.g., air) to flow through the web. Contaminant particles contained within the fluid may be trapped on the fiber web. Fiber web characteristics (e.g., pore size, fiber dimensions, fiber composition, basis weight, amongst others) affect filtration performance of the media. Although different types of filter media are available, improvements are needed.

SUMMARY OF THE INVENTION

Filter media including a filtration layer comprising synthetic fibers (e.g., pleatable backer layer), and related components, systems, and methods associated therewith are provided. The subject matter of this application involves, in some cases, interrelated products, alternative solutions to a particular problem, and/or a plurality of different uses of structures and compositions.

In one set of embodiments, filter media are provided. In one embodiment, a filter media comprises a non-woven web comprising first synthetic fibers having an average fiber diameter of greater than or equal to about 15 microns, wherein the weight percentage of first synthetic fibers of all fibers in the non-woven web is greater than or equal to about 40 wt. %; and second synthetic fibers having an average fiber diameter of greater than or equal to about 0.5 microns and less than about 15 microns, wherein the weight percentage of second synthetic fibers of all fibers in the non-woven web is less than or equal to about 50 wt. %, and wherein the surface average fiber diameter of the non-woven web is greater than or equal to about 13 microns and less than or equal to about 17 microns and is measured using the formula:

$$SAFD[\text{in } um] = 4 \Big/ \Big(SSA \; \rho\Big[\text{in}\tfrac{\text{g}}{\text{cm3}}\Big]\Big)$$

wherein SSA is the BET surface of the filtration layer in $m^2/g$ and $\rho$ is the density of the layer in $g/cm^3$. The filter media may also comprise an efficiency layer and the filter media has a dust holding capacity of greater than or equal to about 20 $g/m^2$.

In another embodiment, a filter media comprises a non-woven web comprising first synthetic fibers having an average fiber diameter of greater than or equal to about 15 microns, wherein the weight percentage of first synthetic fibers of all fibers in the non-woven web is greater than or equal to about 40 wt. %; and second synthetic fibers having an average fiber diameter of greater than or equal to about 0.5 microns and less than about 15 microns, wherein the weight percentage of second synthetic fibers of all fibers in the non-woven web is less than or equal to about 50 wt. %, wherein the surface average fiber diameter of the non-woven web is greater than or equal to about 13 microns and less than or equal to about 17 microns and is measured using the formula:

$$SAFD[\text{in } um] = 4 \Big/ \Big(SSA \; \rho\Big[\text{in}\tfrac{\text{g}}{\text{cm3}}\Big]\Big)$$

wherein SSA is the BET surface of the filtration layer in $m^2/g$ and $\rho$ is the density of the layer in $g/cm^3$, and wherein the basis weight of the non-woven web is less than or equal to about 110 $g/m^2$. The filter media may also comprise an efficiency layer.

In another set of embodiments, a wetlaid non-woven web is provided. In one embodiment, a wetlaid non-woven web comprises first synthetic fibers having an average fiber diameter of greater than or equal to about 15 microns, wherein the weight percentage of first synthetic fibers of all fibers in the wetlaid non-woven web is greater than or equal to about 40 wt. %; and second synthetic fibers having an average fiber diameter of greater than or equal to about 0.5 microns and less than about 15 microns, wherein the weight percentage of second synthetic fibers of all fibers in the wetlaid non-woven web is less than or equal to about 50 wt. %, and wherein the surface average fiber diameter of the wetlaid non-woven web is greater than or equal to about 13 microns and less than or equal to about 17 microns and is measured using the formula:

$$SAFD[\text{in } um] = 4 \Big/ \Big(SSA \; \rho\Big[\text{in}\tfrac{\text{g}}{\text{cm3}}\Big]\Big)$$

wherein SSA is the BET surface of the filtration layer in $m^2/g$ and $\rho$ is the density of the layer in $g/cm^3$.

In yet another set of embodiments, methods are provided. In one embodiment, a method of manufacturing a non-woven web comprises providing first synthetic fibers having an average fiber diameter of greater than or equal to about 15 microns; providing second synthetic fibers having an average fiber diameter of greater than or equal to about 0.5 microns and less than about 15 microns; and forming a non-woven web using a wetlaid process, wherein the weight percentage of first synthetic fibers of all fibers in the non-woven web is greater than or equal to about 40 wt. %, the weight percentage of second synthetic fibers of all fibers in the non-woven web is less than or equal to about 50 wt. %, and the surface average fiber diameter of the non-woven web is greater than or equal to about 13 microns and less than or equal to about 17 microns and is measured using the formula:

$$SAFD[\text{in } um] = 4 \Big/ \left( SSA \, \rho \left[ \text{in} \frac{g}{cm3} \right] \right)$$

wherein SSA is the BET surface of the filtration layer in $m^2/g$ and $\rho$ is the density of the layer in $g/cm^3$.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
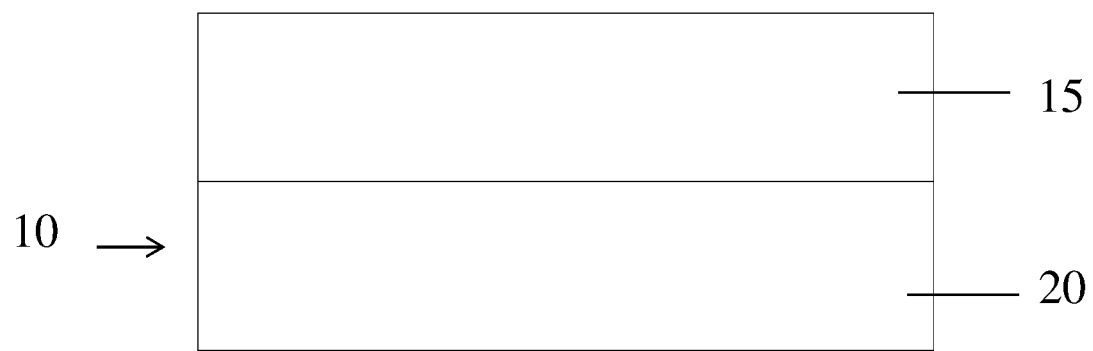
FIGS. 1A-1D show cross-sections of filter media according to certain embodiments.

Filter media including a filtration layer (e.g., pleatable backer layer) comprising synthetic fibers and related components, systems, and methods associated herewith are provided. In some embodiments, the filtration layer may be a non-woven web (e.g., wetlaid non-woven web) comprising a blend of coarse and fine diameter synthetic fibers. The filtration layer comprising synthetic fibers may be designed to have desirable performance properties without compromising certain mechanical properties, such as the pleatability of the media. For example, fiber characteristics (e.g., diameters, composition) of the layer and relative weight percentages in the layer may be selected to impart beneficial properties, such as high dust holding capacity. In some embodiments, the filtration layer may comprise a relatively high weight percentage of synthetic fibers and/or be substantially free of glass fibers to impart durability and/or suitability for certain applications. In some instances, the filtration layer comprising synthetic fibers may comprise a binder (e.g., resin, fibers) that imparts stiffness. In some embodiments, a filter media, described herein, may comprise the filtration layer comprising synthetic fibers and an efficiency layer. Such a filter media may have a relatively high dust holding capacity and/or be pleatable. Filter media described herein may be particularly well-suited for applications that involve filtering air, though the media may also be used in other applications.

In some conventional filter media, desirable properties, such as high dust holding capacity and pleatability, are achieved using glass fibers. However, filter media comprising glass fibers may not be suitable for certain applications. For instance, such filter media may not be suitable in biohazard applications that require incineration of filtration material. Moreover, in some environments, glass fibers may leach sodium ions (e.g., Na+), which can lead to physical abrasion or soap formation. In some instances, filter media comprising a certain amount of glass fibers may not be sufficiently durable for certain dry and humid environments.

Some existing filter media have tried to address this problem by simply replacing glass fibers with cellulose and/or synthetic fibers. However, in such existing filter media, a tradeoff may exist between certain performance properties (e.g., dust holding capacity) and certain mechanical properties (e.g., durability, stiffness). Accordingly, there is a need for filter media, especially filter media comprising a relatively low weight percentage of glass fibers or no glass fibers, that have desirable performance properties as well as mechanical properties.

As will be described in more detail below, a filtration layer comprising a suitable blend of coarse and fine diameter synthetic fibers (e.g., to produce a certain surface average fiber diameter) may have beneficial performance properties (e.g., dust holding capacity) without comprising certain mechanical properties (e.g., stiffness, durability). In some embodiments, filter media comprising such a filtration layer does not suffer from one or more limitations of existing and/or conventional filter media. For instance, such a filtration layer may have a relatively high dust holding capacity and have sufficient stiffness for pleatability.

In some embodiments, such a filtration layer may be a non-woven web comprising coarse and fine diameter synthetic fibers. The fiber diameters and relative weight percentages of the synthetic fibers may be selected such that the non-woven web has a certain surface average fiber diameter, as described in more detail below. For instance, the filtration layer comprising synthetic fibers may comprise greater than or equal to about 40 wt. % of one or more coarse diameter fibers (e.g., greater than or equal to about 15 microns) and less than or equal to about 50 wt. % of one or more fine diameter fibers (e.g., less than about 15 microns) to produce a surface average fiber diameter within a desired range, e.g., greater than or equal to about 13 microns and less than or equal to about 17 microns. In such embodiments, the filter media may have a dust holding capacity of greater than or equal to about 20 $g/m^2$ and/or a Gurley stiffness of, e.g., greater than or equal to about 50 mg and less than or equal to about 1,500 mg in the cross direction. As described in more detail below, the filtration layer comprising synthetic fibers, described herein, may have a higher dust holding capacity and/or air permeability than a filtration layer having the same surface average fiber diameter, but different fiber characteristics (e.g., relative weight percentage, diameter).

Figure 1B:
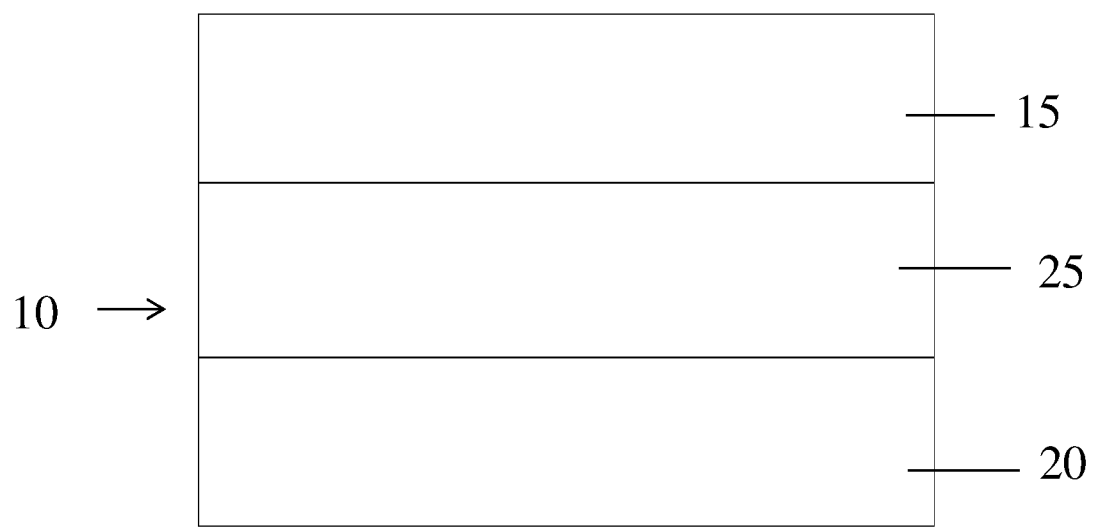
Figure 1C:
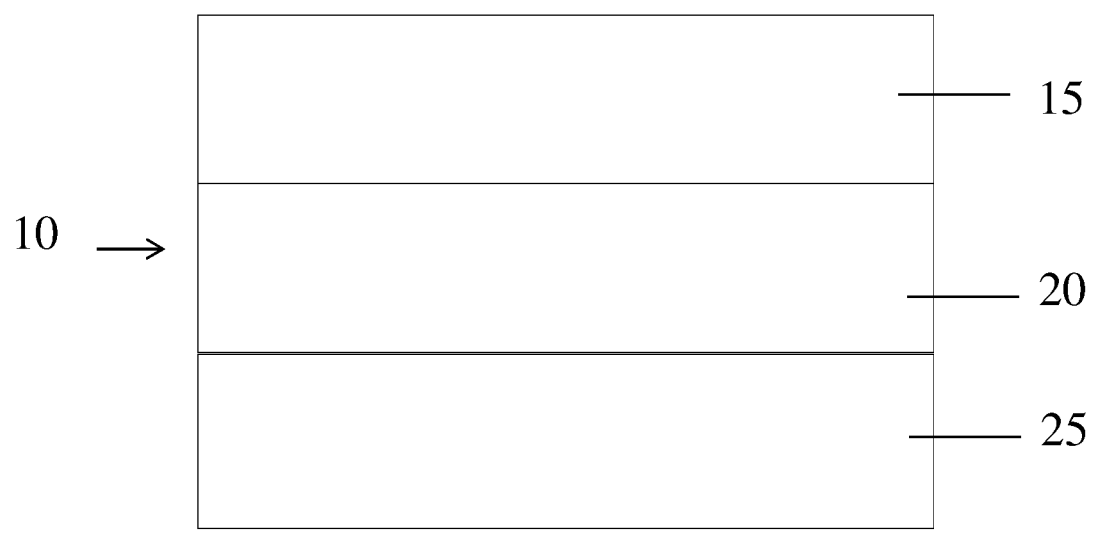
Figure 1D:
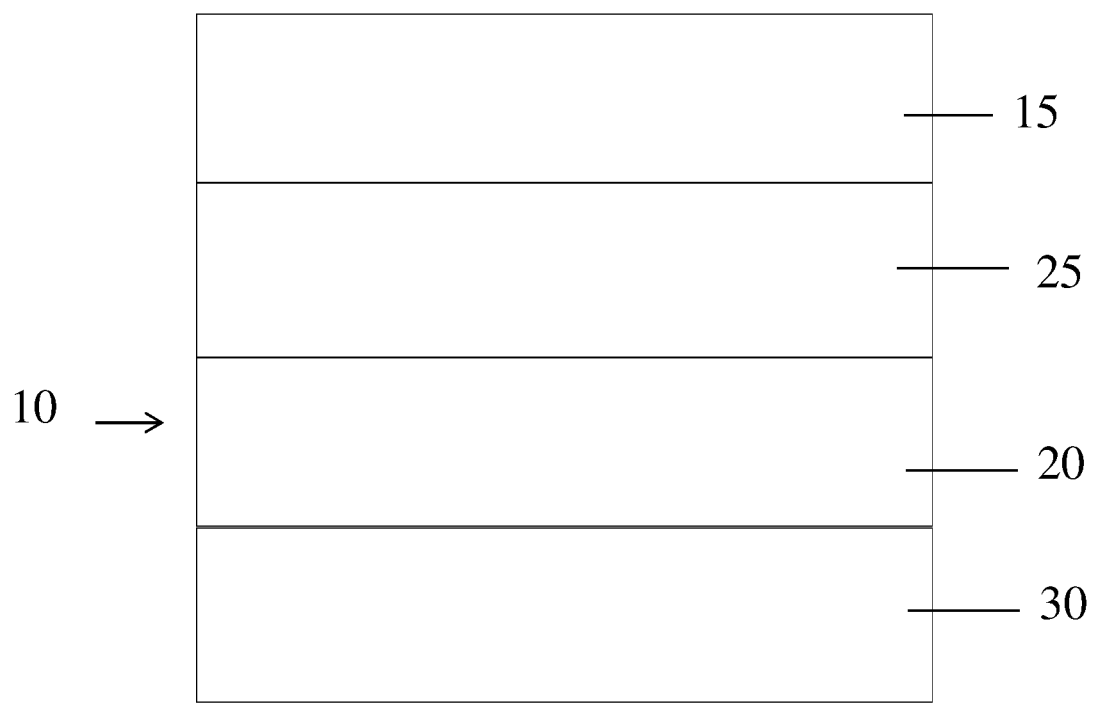

Non-limiting examples of filter media comprising a filtration layer comprising synthetic fibers (e.g., pleatable backer layer) are shown in FIGS. 1A-1D. In some embodiments, a filter media 10 may include a filtration layer comprising synthetic fibers 15 and a second layer 20 (e.g., efficiency layer). In some embodiments, the filtration layer 15 and the second layer 20 may be directly adjacent as shown in FIGS. 1A and 1C. In other embodiments, layers 15 and 20 may be indirectly adjacent to one another, and one or more intervening layers (e.g., pre-filter layer) may separate the layers as illustrated in FIGS. 1B and 1D. In some embodiments, filter media 10 may comprise one or more optional layers (e.g., pre-filter layer) positioned upstream and/or downstream of layers 15 and 20 as illustrated in FIGS. 1B-D. For instance, as illustrated in FIG. 1B, in some embodiments, the filter media may comprise a third layer 25 downstream of the filtration layer comprising synthetic fibers (e.g., pleatable backer layer) and upstream of the second layer. In some instances, the third layer may be directly adjacent to the second layer (e.g., efficiency layer). In other embodiments, layers 20 and 25 may be indirectly adjacent to one another, and one or more intervening layers may separate the layers.

Regardless of whether the filter media comprises layer 25, the filter media 10 may comprise a layer 30 downstream of the second layer as shown in FIG. 1D. In some instances, the layer 30 may be directly adjacent to the second layer. In other embodiments, one or more intervening layers may separate the layers 15 and 30. In some embodiments, filter media 10 may include a filtration layer 15, a second layer 20, a third layer 25, and a fourth layer 30, as shown illustratively in FIG. 1D. In other embodiments, filter media 10 may include a filtration layer 15, a second layer 20, and either a third layer 25 or a fourth layer 30.

In general, the one or more optional layers may be any suitable layer (e.g., a scrim layer, a substrate layer, an efficiency layer, a capacity layer, a spacer layer, a support layer).

As used herein, when a layer is referred to as being "adjacent" another layer, it can be directly adjacent the layer, or an intervening layer also may be present. A layer that is "directly adjacent" another layer means that no intervening layer is present.

In some embodiments, one or more layers in the filter media may be designed to be discrete from another layer. That is, the fibers from one layer do not substantially intermingle (e.g., do not intermingle at all) with fibers from another layer. For example, with respect to FIGS. 1A-1D, in one set of embodiments, fibers from the filtration layer comprising synthetic fibers do not substantially intermingle with fibers of the second layer (e.g., efficiency layer). Discrete layers may be joined by any suitable process including, for example, lamination, thermo-dot bonding, calendering, ultrasonic processes, or by adhesives, as described in more detail below. It should be appreciated, however, that certain embodiments may include one or more layers that are not discrete with respect to one another.

It should be understood that the configurations of the layers shown in the figures are by way of example only, and that in other embodiments, filter media including other configurations of layers may be possible. For example, while the first, optional second, optional third, and optional fourth layers are shown in a specific order in FIGS. 1A-1D, other configurations are also possible. For instance, the filter media may comprise the filtration layer 15 and may not comprise second layer 20 (e.g., efficiency layer). In some such embodiments, an article (e.g., filter media) may consist essentially of filtration layer 15 (e.g., pleatable backer layer). In certain embodiments, the article may comprise filtration layer 15. It should be appreciated that the terms "second", "third" and "fourth" layers, as used herein, refer to different layers within the media, and are not meant to be limiting with respect to the location of that layer. Furthermore, in some embodiments, additional layers (e.g., "fifth", "sixth", or "seventh" layers) may be present in addition to the ones shown in the figures. It should also be appreciated that not all layers shown in the figures need be present in some embodiments.

In some embodiments, the structural features of filtration layer (e.g., pleatable backer layer) may be selected to produce a layer that imparts beneficial performance properties to the filter media while having relatively minimal or no adverse effects on another property (e.g., stiffness) of the filter media. In certain embodiments, the filtration layer may have a blend of coarse and fine diameter fibers that produces a surface average fiber diameter that imparts sufficient dust holding capacity and/or air permeability at a relatively low basis weight. The term "surface average fiber diameter" is described in more detail below. In some embodiments, the filtration layer comprising synthetic fibers may serve as a backer layer in a pleatable filter media.

For instance, in some embodiments, the filtration layer comprising synthetic fibers may serve as a depth filtration layer that trap particles within the layer. In some embodiments, suitable ranges for surface average fiber diameter, weight percentage of coarse diameter fibers, and weight percentage of fine diameter are needed to allow for depth filtration. For example, if the surface average fiber diameter is above the suitable range, the ability of the filtration layer comprising synthetic fibers to trap particles may be substantially diminished. If the surface average fiber diameter is below the suitable range, the filtration mechanism of the layer may change to surface filtration in which many particles are trapped on the upstream surface of the layer and, as a result, the layer may have a higher pressure drop. In some embodiments, a high pressure drop can reduce the service life of the filter media. Without being bound by theory, it is believed that the surface average fiber diameter may serve as a parameter that is predictive of the efficiency and filtration mechanism of the layer (e.g. depth filtration, surface filtration).

Even if the surface average fiber diameter is within a suitable range, a weight percentage of fine diameter fibers above the suitable range may result in a reduction in air permeability and dust holding capacity, due at least in part to webbing and/or bundling of the fine diameter fibers in the presence of certain binders and/or during the web manufacturing process. The webbing and/or bundling of the fine diameter fibers may result in blockage of a significant percentage of the pores in a layer. In embodiments in which the surface average fiber diameter is within a suitable range, a weight percentage of coarse diameter fibers above the suitable range may result in a layer having a reduced capacity to trap particles. In certain embodiments, a blend of coarse and fine diameter fibers may be needed to achieve a suitable surface average fiber diameter.

In general, a filtration layer may comprise multiple fibers having different average fiber diameters and/or fiber diameter distributions. In such cases, the average diameter of the fibers in a layer may be characterized using a weighted average, such as the surface average fiber diameter. The surface average fiber diameter is defined as $$d=\Sigma(m_i/\hat{\rho}_i)/\Sigma(m_i/d_i\hat{\rho}_i);$$

wherein d is the surface average fiber diameter in microns and is $m_i$ the number fraction of the fibers with diameter $d_i$ in microns and density $\hat{\rho}_i$ in g/cm³ in the filtration layer. The equation assumes that the fibers are cylindrical, the fibers have a circular cross-section, and that the fiber length is significantly greater than the diameter of the fibers. It should be understood that the equation also provides meaningful surface average fiber diameter values when a non-woven web includes fibers that are substantially cylindrical and have a substantially circular cross-section.

The surface average fiber diameter may be computed using the equation above or measured, as described further below. In embodiments in which the diameters, densities, and mass percentages of the fibers in the filtration layer are known, the surface average fiber diameter may be computed.

In other embodiments, the surface average fiber diameter of the filtration layer may be determined by measuring the BET surface average of the filtration layer (i.e., SSA) and the density ρ of the layer, as described in more detail below. In such cases, the surface average fiber diameter SAFD may be determined using the modified formula below:

$$SAFD[\text{in } um] = 4 \bigg/ \left( SSA \cdot \rho \left[\text{in} \frac{g}{cm3}\right] \right)$$

wherein SSA is the BET surface of the filtration layer in $m^2/g$ and ρ is the density of the layer in $g/cm^3$.

As used herein, the BET surface area is measured through use of a standard BET surface area measurement technique. The BET surface area is measured according to section 10 of Battery Council International Standard BCIS-03A, "Recommended Battery Materials Specifications Valve Regulated Recombinant Batteries", section 10 being "Standard Test Method for Surface Area of Recombinant Battery Separator Mat". Following this technique, the BET surface area is measured via adsorption analysis using a BET surface analyzer (e.g., Micromeritics Gemini III 2375 Surface Area Analyzer) with nitrogen gas; the sample amount is between 0.5 and 0.6 grams in, e.g., a ¾" tube; and, the sample is allowed to degas at 75 degrees C. for a minimum of 3 hours.

As used herein, the density of a layer may be determined by accurately measuring the mass and volume of the layer (e.g., excluding the void volume) and then calculating the density of the layer. The mass of the layer may be determined by weighing the layer. The volume of the layer may be determined using any known method of accurately measuring volume. For example, the volume may be determined using pycnometry. As another example, the volume of the layer may be determined using an Archimedes method provided that an accurate measurement of volume is produced. For example, the volume may be determined by fully submerging the layer in a wetting fluid and measuring the volume displacement of the wetting liquid as a result of fully submerging the layer.

In some embodiments, the filtration layer comprising synthetic fibers may have a surface average fiber diameter of greater than or equal to about 10 microns, greater than or equal to about 11 microns, greater than or equal to about 12 microns, greater than or equal to about 13 microns, greater than or equal to about 14 microns, greater than or equal to about 15 microns, greater than or equal to about 16 micron, greater than or equal to about 17 microns, greater than or equal to about 18 microns, or greater than or equal to about 19 microns. In some instances, the surface average fiber diameter may be less than or equal to about 20 microns, less than or equal to about 19 microns, less than or equal to about 18 microns, less than or equal to about 18 microns, less than or equal to about 17 microns, less than or equal to about 16 microns, less than or equal to about 15 microns, less than or equal to about 14 microns, less than or equal to about 13 microns, or less than or equal to about 12 microns. All suitable combinations of the above-referenced ranges are also possible (e.g., greater than or equal to about 13 microns and less than or equal to about 17 microns, greater than or equal to about 14 microns and less than or equal to about 16 microns). In some embodiments, a surface average fiber diameter of greater than or equal to about 13 microns and less than or equal to about 17 microns may be preferred.

As noted above, the filtration layer comprising synthetic fibers comprises a blend of coarse and fine diameter fibers that produces a suitable surface average fiber diameter. For instance, in some embodiments, the filtration layer comprising synthetic fibers may comprise a relatively high weight percentage of coarse diameter fibers (e.g., greater than or equal to about 40 wt. %). In certain embodiments, the total weight percentage of coarse diameter fibers in the filtration layer comprising synthetic fibers and/or in the total weight percentage of coarse diameter fibers of all fibers in the filtration layer may be greater than or equal to about 10 wt. %, greater than or equal to about 20 wt. %, greater than or equal to about 30 wt. %, greater than or equal to about 40 wt. %, greater than or equal to about 50 wt. %, greater than or equal to about 60 wt. %, greater than or equal to about 70 wt. %, greater than or equal to about 80 wt. %, or greater than or equal to about 85 wt. %. In some instances, the total weight percentage of coarse diameter fibers in the filtration layer comprising synthetic fibers and/or in the total weight percentage of coarse diameter fibers of all fibers in the filtration layer may be less than or equal to about 90 wt. %, less than or equal to about 80 wt. %, less than or equal to about 70 wt. %, less than or equal to about 60 wt. %, less than or equal to about 50 wt. %, less than or equal to about 40 wt. %, less than or equal to about 30 wt. %, less than or equal to about 20 wt. %, or less than or equal to about 15 wt. %. All suitable combinations of the above-referenced ranges are also possible (e.g., greater than or equal to about 10 wt. % and less than or equal to about 90 wt. %, greater than or equal to about 40 wt. % and less than or equal to about 80 wt. %). In some embodiments, a total weight percentage of coarse diameter fibers of greater than or equal to about 40 wt. % may be preferred.

In some embodiments, the total weight percentage of coarse diameter fibers in the filtration layer comprising synthetic fibers and/or in the total weight percentage of coarse diameter fibers of all fibers in the filtration layer may include two or more populations of coarse diameter fibers having a different average fiber diameter. For instance, a filtration layer comprising synthetic fibers having a total weight percentage of coarse diameter fibers of greater than or equal to about 40 wt. % and less than or equal to about 80 wt. % may comprise a first population of coarse diameter fibers having an average fiber diameter of greater than or equal to about 15 microns and less than or equal to about 25 microns at a weight percentage of greater than or equal to about 5 wt. % and less than or equal to about 95 wt. % (e.g., greater than or equal to about 10 wt. % and less than or equal to about 60 wt. %) and a second population of coarse diameter fibers having an average fiber diameter of greater than or equal to about 25 microns and less than or equal to about 50 microns at a weight percentage of greater than or equal to about 5 wt. % and less than or equal to about 95 wt. % (e.g., greater than or equal to about 10 wt. % and less than or equal to about 60 wt. %). In certain embodiments, a blend of coarse diameter fibers may be used to help achieve the desired surface average fiber diameter. In general, any suitable number of coarse diameter fiber populations having different average fiber diameters may be used. In other embodiments, the total weight percentage of coarse diameter fibers is composed of one population of coarse diameter fibers. That is, the layer does not comprise two or more populations of coarse diameter fibers having a different average fiber diameter.

In some embodiments, coarse diameter fibers used in the filtration layer comprising synthetic fibers may have an average fiber of diameter greater than or equal to about 15 microns, greater than or equal to about 17 microns, greater than or equal to about 20 microns, greater than or equal to about 25 microns, greater than or equal to about 30 microns, greater than or equal to about 35 microns, greater than or equal to about 40 micron, greater than or equal to about 45 microns, greater than or equal to about 50 microns, or greater than or equal to about 55 microns. In some instances, the average fiber diameter may be less than or equal to about 60 microns, less than or equal to about 55 microns, less than or equal to about 50 microns, less than or equal to about 45 microns, less than or equal to about 40 microns, less than or equal to about 35 microns, less than or equal to about 30 microns, less than or equal to about 25 microns, less than or equal to about 20 microns, or less than or equal to about 17 microns. All suitable combinations of the above-referenced ranges are also possible (e.g., greater than or equal to about 10 microns and less than or equal to about 60 microns, greater than or equal to about 17 microns and less than or equal to about 35 microns).

In some embodiments, the coarse diameter fibers in the filtration layer comprising synthetic fibers may have an average length of greater than or equal to about 3 mm, greater than or equal about 6 mm, greater than or equal about 9 mm, greater than or equal about 12 mm, greater than or equal about 15 mm, greater than or equal about 18 mm, greater than or equal about 20 mm, greater than or equal about 22 mm, or greater than or equal about 25 mm. In some instances, the average length of the coarse diameter fibers may be less than or equal to about 30 mm, less than or equal to about 27 mm, less than or equal to about 25 mm, less than or equal to about 22 mm, less than or equal to about 20 mm, less than or equal to about 18 mm, less than or equal to about 15 mm, less than or equal to about 12 mm, less than or equal to about 9 mm, or less than or equal to about 6 mm. All suitable combinations of the above-referenced ranges are also possible (e.g., greater than or equal about 3 mm and less than or equal to about 30 mm, greater than or equal about 6 mm and less than or equal to about 12 mm).

As noted above, the filtration layer comprising synthetic fibers may comprise a blend of coarse diameter fibers and fine diameter fibers to produce a suitable surface average fiber diameter. In certain embodiments, the total weight percentage of fine diameter fibers in the filtration layer comprising synthetic fibers and/or in the total weight percentage of fine diameter fibers of all fibers in the filtration layer may be less than or equal to about 50 wt. %, less than or equal to about 45 wt. %, less than or equal to about 40 wt. %, less than or equal to about 35 wt. %, less than or equal to about 30 wt. %, less than or equal to about 25 wt. %, less than or equal to about 20 wt. %, or less than or equal to about 15 wt. %. In some instances, the total weight percentage of fine diameter fibers in the filtration layer comprising synthetic fibers and/or in the total weight percentage of fine diameter fibers of all fibers in the filtration layer may be greater than or equal to about 0.5 wt. %, greater than or equal to about 5 wt. %, greater than or equal to about 10 wt. %, greater than or equal to about 15 wt. %, greater than or equal to about 20 wt. %, greater than or equal to about 25 wt. %, greater than or equal to about 30 wt. %, greater than or equal to about 35 wt. %, greater than or equal to about 40 wt. %, or greater than or equal to about 45 wt. %. All suitable combinations of the above-referenced ranges are also possible (e.g., greater than or equal to about 0.5 wt. % and less than or equal to about 50 wt. %, greater than or equal to about 10 wt. % and less than or equal to about 30 wt. %).

In some embodiments, the total weight percentage of fine diameter fibers in the filtration layer comprising synthetic fibers and/or in the total weight percentage of fine diameter fibers of all fibers in the filtration layer may include two or more populations of fine diameter fibers having a different average fiber diameter. For instance, a filtration layer comprising synthetic fibers having a total weight percentage of fine diameter fibers of greater than or equal to about 10 wt. % and less than or equal to about 30 wt. % may comprise a first population of fine diameter fibers having an average fiber diameter of greater than or equal to about 0.1 microns and less than or equal to about 10 microns at a weight percentage of greater than or equal to about 5 wt. % and less than or equal to about 95 wt. % (e.g., greater than or equal to about 10 wt. % and less than or equal to about 60 wt. %) and a second population of fine diameter fibers having an average fiber diameter of greater than or equal to about 10 microns and less than about 15 microns at a weight percentage of greater than or equal to about 5 wt. % and less than or equal to about 95 wt. % (e.g., greater than or equal to about 10 wt. % and less than or equal to about 60 wt. %). In certain embodiments, the blend of fine diameter fibers may be used to help achieve the desired surface average fiber diameter. In general, any suitable number of fine fiber populations having different average fiber diameters may be used. In other embodiments, the total weight percentage of fine diameter fibers is composed of one population of fine diameter fibers. That is, the layer does not comprise two or more populations of fine diameter fibers having a different average fiber diameter.

In some embodiments, fine diameter fibers used in the filtration layer comprising synthetic fibers may have an average fiber diameter of less than about 15 microns, less than or equal to about 12 microns, less than or equal to about 10 microns, less than or equal to about 8 microns, less than or equal to about 6 microns, less than or equal to about 5 microns, less than or equal to about 4 microns, less than or equal to about 3 microns, less than or equal to about 2 microns, or less than or equal to about 1 micron. In some instances, the average fiber diameter may be greater than or equal to about 0.5 microns, greater than or equal to about 1 micron, greater than or equal to about 2 microns, greater than or equal to about 3 microns, greater than or equal to about 4 microns, greater than or equal to about 5 microns, greater than or equal to about 6 microns, greater than or equal to about 8 microns, greater than or equal to about 10 microns, or greater than or equal to about 12 microns. All suitable combinations of the above-referenced ranges are also possible (e.g., greater than or equal to about 0.5 microns and less than about 15 microns, greater than or equal to about 2 microns and less than or equal to about 10 microns).

In some embodiments, the fine diameter fibers in the filtration layer comprising synthetic fibers may have an average length of greater than or equal to about 0.1 mm, greater than or equal to about 0.3 mm, greater than or equal to about 0.5 mm, greater than or equal to about 0.8 mm, greater than or equal to about 1 mm, greater than or equal to about 3 mm, greater than or equal about 6 mm, greater than or equal about 9 mm, greater than or equal about 12 mm, greater than or equal about 15 mm, greater than or equal about 18 mm, greater than or equal about 20 mm, greater than or equal about 22 mm, or greater than or equal about 25 mm. In some instances, the average length of the fine diameter fibers may be less than or equal to about 30 mm, less than or equal to about 27 mm, less than or equal to about 25 mm, less than or equal to about 22 mm, less than or equal to about 20 mm, less than or equal to about 18 mm, less than or equal to about 15 mm, less than or equal to about 12 mm, less than or equal to about 9 mm, less than or equal to about 6 mm, less than or equal to about 3 mm, or less than or equal to about 1 mm. All suitable combinations of the above-referenced ranges are also possible (e.g., greater than or equal about 0.1 mm and less than or equal to about 30 mm, greater than or equal about 0.3 mm and less than or equal to about 12 mm).

In some embodiments, the coarse and/or fine diameter fibers are not glass fibers. In certain embodiments, a relatively high weight percentage of the total coarse and/or fine diameter fibers the filtration layer comprising synthetic fibers may be synthetic fibers. For instance, in some embodiments, the weight percentage of synthetic fibers of all fibers in the filtration layer may be greater than or equal to about 80 wt. %, greater than or equal to about 85 wt. %, greater than or equal to about 88 wt. %, greater than or equal to about 90 wt. %, greater than or equal to about 92 wt. %, greater than or equal to about 95 wt. %, greater than or equal to about 97 wt. %, or greater than or equal to about 99 wt. %. In some embodiments, the filtration layer comprising synthetic fibers may include 100 wt. % synthetic fibers. In some embodiments, the filtration layer comprising synthetic fibers may be substantially free of glass fibers.

In certain embodiments, the weight percentage of coarse synthetic fibers of all coarse diameter fibers in the filtration layer comprising synthetic fibers may be greater than or equal to about 80 wt. %, greater than or equal to about 85 wt. %, greater than or equal to about 88 wt. %, greater than or equal to about 90 wt. %, greater than or equal to about 92 wt. %, greater than or equal to about 95 wt. %, greater than or equal to about 97 wt. %, or greater than or equal to about 99 wt. %. In certain embodiments, the weight percentage of coarse synthetic fibers of all coarse diameter fibers in the filtration layer comprising synthetic fibers may be 100 wt. %. In some embodiments, the weight percentage of synthetic fibers of all fine diameter fibers in the filtration layer comprising synthetic fibers may be greater than or equal to about 80 wt. %, greater than or equal to about 85 wt. %, greater than or equal to about 88%, greater than or equal to about 90 wt. %, greater than or equal to about 92 wt. %, greater than or equal to about 95 wt. %, greater than or equal to about 97 wt. %, or greater than or equal to about 99 wt. %. In some embodiments, the weight percentage of synthetic fibers of all fine diameter fibers in the filtration layer comprising synthetic fibers may be 100 wt. %.

In general, synthetic fibers may include any suitable type of synthetic polymer. Examples of suitable synthetic fibers include polyesters (e.g., polyethylene terephthalate, polybutylene terephthalate), polycarbonate, polyamides (e.g., various nylon polymers), polyaramid, polyimide, polyethylene, polypropylene, polyether ether ketone, polyolefin, acrylics, polyvinyl alcohol, regenerated cellulose (e.g., synthetic cellulose such lyocell, rayon), polyacrylonitriles, polyvinylidene fluoride (PVDF), copolymers of polyethylene and PVDF, polyether sulfones, and combinations thereof. In some embodiments, the synthetic fibers are organic polymer fibers. Synthetic fibers may also include multicomponent fibers (i.e., fibers having multiple compositions such as bicomponent fibers). In some cases, synthetic fibers may include meltblown, meltspun, electrospun (e.g., melt, solvent), or centrifugal spun fibers, which may be formed of polymers described herein (e.g., polyester, polypropylene). In some embodiments, synthetic fibers may be staple fibers. In some embodiments, the synthetic fibers may be flame retardant fibers. The filter media, as well as each of the layers within the filter media, may also include combinations of more than one type of synthetic fiber. It should be understood that other types of synthetic fibers may also be used.

In some embodiments, the filtration layer comprising synthetic fibers may include flame retardant fibers, such as phosphoric-containing fibers, nitrogen-containing fibers, and/or halogen-containing fibers. In some embodiments, the flame retardant fibers may be synthetic fibers. In general, the total weight percentage of coarse and/or fine diameter fibers may include flame retardant fibers. In some embodiments, the total weight percentage of flame retardant fibers in the filtration layer comprising synthetic fibers and/or in the total weight percentage of flame retardant fibers of all fibers in the filtration layer may be greater than or equal to about 0.5 wt. %, greater than or equal to about 1 wt. %, greater than or equal to about 5 wt. %, greater than or equal to about 10 wt. %, greater than or equal to about 20 wt. %, greater than or equal to about 30 wt. %, greater than or equal to about 40 wt. %, greater than or equal to about 50 wt. %, greater than or equal to about 60 wt. %, greater than or equal to about 70 wt. %, greater than or equal to about 80 wt. %, or greater than or equal to about 90 wt. %. In some instances, total weight percentage may be less than or equal to about 100 wt. %, less than or equal to about 90 wt. %, less than or equal to about 80 wt. %, less than or equal to about 70 wt. %, less than or equal to about 60 wt. %, less than or equal to about 50 wt. %, less than or equal to about 40 wt. %, less than or equal to about 30 wt. %, less than or equal to about 20 wt. %, less than or equal to about 15 wt. %, less than or equal to about 10 wt. %, or less than or equal to about 5 wt. %. All suitable combinations of the above-referenced ranges are also possible (e.g., greater than or equal to about 0.5 wt. % and less than or equal to about 100 wt. %). In other embodiments, the filtration layer comprising synthetic fibers may comprise 0 wt. % of flame retardant fibers.

In some embodiments, the filtration layer comprising synthetic fibers may comprise one or more binders (e.g., binder resin, binder fiber) that serves to impart structural integrity to the filtration layer, as well as provide important mechanical properties, such as Gurley stiffness, Mullen burst, and/or tensile strength, to the media.

In some embodiments, the binder may be one or more binder fibers. In general, binder fibers may be used to join fibers within the layer. In some embodiments, binder fibers comprise polymers with a lower melting point than one or more major component in the layer, such as certain fibers. Binder fibers may be monocomponent (e.g., polyethylene fibers, copolyester fibers) or multicomponent (e.g., bicomponent fibers). For example, a binder fiber may be a bicomponent fiber. The bicomponent fibers may comprise a thermoplastic polymer. Each component of the bicomponent fiber can have a different melting temperature. For example, the fibers can include a core and a sheath where the activation temperature of the sheath is lower than the melting temperature of the core. This allows the sheath to melt prior to the core, such that the sheath binds to other fibers in the layer, while the core maintains its structural integrity. The core/sheath binder fibers can be concentric or non-concentric. Other exemplary bicomponent fibers can include split fiber fibers, side-by-side fibers, and/or "island in the sea" fibers. In general, the total weight percentage of coarse and/or fine diameter fibers may include binder fibers.

In some embodiments, the binder may be one or more binder resins. In general, binder resin may be used to join fibers within the layer. In general, the binder resin may have any suitable composition. For example, the binder resin may comprise a thermoplastic (e.g., acrylic, polyvinylacetate, polyester, polyamide), a thermoset (e.g., epoxy, phenolic resin), or a combination thereof. In some cases, a binder resin includes one or more of a vinyl acetate resin, an epoxy resin, a polyester resin, a copolyester resin, a polyvinyl alcohol resin, an acrylic resin such as a styrene acrylic resin, and a phenolic resin. Other resins are also possible.

As described further below, the resin may be added to the fibers in any suitable manner including, for example, in the wet state. In some embodiments, the resin coats the fibers and is used to adhere fibers to each other to facilitate adhesion between the fibers. Any suitable method and equipment may be used to coat the fibers, for example, using curtain coating, gravure coating, melt coating, dip coating, knife roll coating, or spin coating, amongst others. In some embodiments, the binder is precipitated when added to the fiber blend. When appropriate, any suitable precipitating agent (e.g., Epichlorohydrin, fluorocarbon) may be provided to the fibers, for example, by injection into the blend. In some embodiments, upon addition to the fibers, the resin is added in a manner such that one or more layer or the entire filter media is impregnated with the resin (e.g., the resin permeates throughout). In a multi-layered web, a resin may be added to each of the layers separately prior to combining the layers, or the resin may be added to the layer after combining the layers. In some embodiments, resin is added to the fibers while in a dry state, for example, by spraying or saturation impregnation, or any of the above methods. In other embodiments, a resin is added to a wet layer.

In certain embodiments, the binder may comprise both binder fibers and binder resin.

Regardless of whether the binder is a binder fiber, binder resin, or both, the total weight percentage of binder in the filtration layer comprising synthetic fibers may be greater than or equal to about 0.5 wt. %, greater than or equal to about 1 wt. %, greater than or equal to about 5 wt. %, greater than or equal to about 10 wt. %, greater than or equal to about 20 wt. %, greater than or equal to about 30 wt. %, greater than or equal to about 40 wt. %, greater than or equal to about 50 wt. %, greater than or equal to about 60 wt. %, greater than or equal to about 70 wt. %, or greater than or equal to about 80 wt. %. In some instances, total weight percentage may be less than or equal to about 90 wt. %, less than or equal to about 80 wt. %, less than or equal to about 70 wt. %, less than or equal to about 60 wt. %, less than or equal to about 50 wt. %, less than or equal to about 40 wt. %, less than or equal to about 30 wt. %, less than or equal to about 20 wt. %, less than or equal to about 15 wt. %, less than or equal to about 10 wt. %, or less than or equal to about 5 wt. %. All suitable combinations of the above-referenced ranges are also possible (e.g., greater than or equal to about 0.5 wt. % and less than or equal to about 90 wt. %, greater than or equal to about 5 wt. % and less than or equal to about 15 wt. %).

In embodiments in which the binder comprises binder fiber and optionally binder resin, the total weight percentage of binder fiber (e.g., bicomponent fiber) in the filtration layer comprising synthetic fibers may be greater than or equal to about 0.5 wt. %, greater than or equal to about 1 wt. %, greater than or equal to about 3 wt. %, greater than or equal to about 5 wt. %, greater than or equal to about 8 wt. %, greater than or equal to about 10 wt. %, greater than or equal to about 20 wt. %, greater than or equal to about 25 wt. %, greater than or equal to about 30 wt. %, greater than or equal to about 40 wt. %, greater than or equal to about 50 wt. %, greater than or equal to about 60 wt. %, greater than or equal to about 70 wt. %, or greater than or equal to about 80 wt. %. In some instances, total weight percentage of binder fiber (e.g., bicomponent fiber) may be less than or equal to about 90 wt. %, less than or equal to about 80 wt. %, less than or equal to about 70 wt. %, less than or equal to about 60 wt. %, less than or equal to about 50 wt. %, less than or equal to about 40 wt. %, less than or equal to about 30 wt. %, less than or equal to about 25 wt. %, less than or equal to about 20 wt. %, less than or equal to about 18 wt. %, less than or equal to about 15 wt. %, less than or equal to about 12 wt. %, less than or equal to about 10 wt. %, less than or equal to about 8 wt. %, less than or equal to about 5 wt. %, less than or equal to about 3 wt. %, or less than or equal to about 1 wt. %. All suitable combinations of the above-referenced ranges are also possible (e.g., greater than or equal to about 0.5 wt. % and less than or equal to about 90 wt. %, greater than or equal to about 5 wt. % and less than or equal to about 15 wt. %, greater than or equal to about 0.5 wt. % and less than or equal to about 10 wt. %). In some embodiments, one or more layers (e.g., filtration layer comprising synthetic fibers, second layer) and/or the entire filter media may include a relatively low percentage (e.g., less than or equal to about 10 wt. %, less than or equal to about 5 wt. %, less than or equal to about 1 wt. %, 0 wt. %) of binder fibers (e.g., bicomponent fibers).

In embodiments in which the binder comprises binder resin and optionally binder fiber, the total weight percentage of binder resin in the filtration layer comprising synthetic fibers may be greater than or equal to about 0.5 wt. %, greater than or equal to about 1 wt. %, greater than or equal to about 3 wt. %, greater than or equal to about 5 wt. %, greater than or equal to about 8 wt. %, greater than or equal to about 10 wt. %, greater than or equal to about 20 wt. %, greater than or equal to about 25 wt. %, greater than or equal to about 30 wt. %, greater than or equal to about 40 wt. %, greater than or equal to about 50 wt. %, greater than or equal to about 60 wt. %, greater than or equal to about 70 wt. %, or greater than or equal to about 80 wt. %. In some instances, total weight percentage of binder resin may be less than or equal to about 90 wt. %, less than or equal to about 80 wt. %, less than or equal to about 70 wt. %, less than or equal to about 60 wt. %, less than or equal to about 50 wt. %, less than or equal to about 40 wt. %, less than or equal to about 30 wt. %, less than or equal to about 25 wt. %, less than or equal to about 20 wt. %, less than or equal to about 18 wt. %, less than or equal to about 15 wt. %, less than or equal to about 12 wt. %, less than or equal to about 10 wt. %, less than or equal to about 8 wt. %, less than or equal to about 5 wt. %, less than or equal to about 3 wt. %, or less than or equal to about 1 wt. %. All suitable combinations of the above-referenced ranges are also possible (e.g., greater than or equal to about 0.5 wt. % and less than or equal to about 90 wt. %, greater than or equal to about 5 wt. % and less than or equal to about 15 wt. %).

In some embodiments, binder fibers used in the filtration layer comprising synthetic fibers may have a fiber diameter greater than or equal to about 1 micron, greater than or equal to about 2 microns, greater than or equal to about 5 microns, greater than or equal to about 8 microns, greater than or equal to about 10 microns, greater than or equal to about 12 microns, greater than or equal to about 15 micron, greater than or equal to about 18 microns, greater than or equal to about 20 microns, greater than or equal to about 22 microns, or greater than or equal to about 25 microns. In some instances, the fiber diameter may be less than or equal to about 30 microns, less than or equal to about 28 microns, less than or equal to about 25 microns, less than or equal to about 22 microns, less than or equal to about 20 microns, less than or equal to about 18 microns, less than or equal to about 15 microns, less than or equal to about 12 microns, less than or equal to about 10 microns, less than or equal to about 5 microns, or less than or equal to about 2 microns. All suitable combinations of the above-referenced ranges are also possible (e.g., greater than or equal to about 1 micron and less than or equal to about 30 microns, greater than or equal to about 2 microns and less than or equal to about 20 microns).

In some embodiments, the binder fibers in the filtration layer comprising synthetic fibers may have an average length of greater than or equal to about 3 mm, greater than or equal about 6 mm, greater than or equal about 9 mm, greater than or equal about 12 mm, greater than or equal about 15 mm, greater than or equal about 18 mm, greater than or equal about 20 mm, greater than or equal about 22 mm, or greater than or equal about 25 mm. In some instances, the average length of the binder fibers may be less than or equal to about 30 mm, less than or equal to about 27 mm, less than or equal to about 25 mm, less than or equal to about 22 mm, less than or equal to about 20 mm, less than or equal to about 18 mm, less than or equal to about 15 mm, less than or equal to about 12 mm, less than or equal to about 9 mm, or less than or equal to about 6 mm. All suitable combinations of the above-referenced ranges are also possible (e.g., greater than or equal about 3 mm and less than or equal to about 30 mm, greater than or equal about 6 mm and less than or equal to about 12 mm).

As described herein, filter media 10 may include a filtration layer comprising synthetic fibers. In some embodiments, the filtration layer comprising synthetic fibers may have certain enhanced mechanical properties, such as Gurley stiffness, tensile strength, and/or Mullen Burst strength. In general, the filtration layer comprising synthetic fibers may provide sufficient Gurley stiffness such that the filter media can be pleated to include sharp, well-defined peaks which can be maintained in a stable configuration during use.

The filtration layer comprising synthetic fibers may have a relatively high Gurley stiffness. For instance, in some embodiments, the filtration layer comprising synthetic fibers may have a Gurley stiffness in the cross direction of greater than or equal to about 50 mg, greater than or equal to about 100 mg, greater than or equal to about 200 mg, greater than or equal to about 300 mg, greater than or equal to about 500 mg, greater than or equal to about 800 mg, greater than or equal to about 1,000 mg, greater than or equal to about 1,200 mg, or greater than or equal to about 1,400 mg. In some embodiments, the filtration layer comprising synthetic fibers may have a Gurley stiffness in the cross direction of less than or equal to about 1,500 mg, less than or equal to about 1,400 mg, less than or equal to about 1,200 mg, less than or equal to about 1,000 mg, less than or equal to about 800 mg, less than or equal to about 500 mg, less than or equal to about 300 mg, less than or equal to about 200 mg, or less than or equal to about 100 mg. All suitable combinations of the above-referenced ranges are also possible (e.g., greater than or equal to about 50 mg and less than or equal to about 1,500 mg, greater than or equal to about 200 mg and less than or equal to about 1,000 mg). The stiffness may be determined using the Gurley stiffness (bending resistance) recorded in units of mm (equivalent to gu) in accordance with TAPPI T543 om-94.

In some embodiments, the filtration layer comprising synthetic fibers may have a Gurley stiffness in the machine direction of greater than or equal to about 200 mg, greater than or equal to about 350 mg, greater than or equal to about 500 mg, greater than or equal to about 750 mg, greater than or equal to about 1,000 mg, greater than or equal to about 1,500 mg, greater than or equal to about 2,000 mg, greater than or equal to about 2,500 mg, or greater than or equal to about 3,000 mg. In some embodiments, the filtration layer comprising synthetic fibers may have a Gurley stiffness in the machine direction of less than or equal to about 3,500 mg, less than or equal to about 3,000 mg, less than or equal to about 2,500 mg, less than or equal to about 2,000 mg, less than or equal to about 1,500 mg, less than or equal to about 1,000 mg, less than or equal to about 750 mg, or less than or equal to about 500 mg. All suitable combinations of the above-referenced ranges are also possible (e.g., greater than or equal to about 200 mg and less than or equal to about 3,500 mg, greater than or equal to about 350 mg and less than or equal to about 2,000 mg).

In some embodiments, the filtration layer comprising synthetic fibers may have a dry tensile strength in the machine direction (MD) of greater than or equal to about 2 lb/in, greater than or equal to about 4 lb/in, greater than or equal to about 5 lb/in, greater than or equal to about 10 lb/in, greater than or equal to about 15 lb/in, greater than or equal to about 20 lb/in, greater than or equal to about 30 lb/in, greater than or equal to about 40 lb/in, greater than or equal to about 50 lb/in, or greater than or equal to about 55 lb/in. In some instances, the dry tensile strength in the machine direction may be less than or equal to about 60 lb/in, less than or equal to about 50 lb/in, less than or equal to about 40 lb/in, less than or equal to about 30 lb/in, less than or equal to about 20 lb/in, less than or equal to about 10 lb/in, or less than or equal to about 5 lb/in. All suitable combinations of the above-referenced ranges are also possible (e.g., greater than or equal to about 2 lb/in and less than or equal to about 60 lb/in, greater than or equal to about 10 lb/in and less than or equal to about 40 lb/in). Other values of dry tensile strength in the machine direction are also possible. The dry tensile strength in the machine direction may be determined according to the standard T494 om-96 using a test span of 4 in and a jaw separation speed of 1 in/min.

In some embodiments, the filtration layer comprising synthetic fibers may have a dry tensile strength in the cross direction (CD) of greater than or equal to about 1 lb/in, greater than or equal to about 2 lb/in, greater than or equal to about 5 lb/in, greater than or equal to about 6 lb/in, greater than or equal to about 8 lb/in, greater than or equal to about 10 lb/in, greater than or equal to about 12 lb/in, greater than or equal to about 15 lb/in, or greater than or equal to about 18 lb/in. In some instances, the dry tensile strength in the cross direction may be less than or equal to about 20 lb/in, less than or equal to about 18 lb/in, less than or equal to about 15 lb/in, less than or equal to about 12 lb/in, less than or equal to about 10 lb/in, less than or equal to about 8 lb/in, less than or equal to about 6 lb/in, or less than or equal to about 5 lb/in. All suitable combinations of the above-referenced ranges are also possible (e.g., greater than or equal to about 1 lb/in and less than or equal to about 20 lb/in, greater than or equal to about 6 lb/in and less than or equal to about 15 lb/in). Other values of dry tensile strength in the cross direction are also possible. The dry tensile strength in the cross direction may be determined according to the standard T494 om-96 using a test span of 4 in and a jaw separation speed of 1 in/min.

In some embodiments, the filtration layer comprising synthetic fibers may have a dry Mullen Burst strength of greater than or equal to about 5 psi, greater than or equal to about 20 psi, greater than or equal to about 25 psi, greater than or equal to about 30 psi, greater than or equal to about 50 psi, greater than or equal to about 75 psi, greater than or equal to about 100 psi, greater than or equal to about 125 psi, greater than or equal to about 150 psi, greater than or equal to about 175 psi, greater than or equal to about 200 psi, greater than or equal to about 225 psi, or greater than or equal to about 240 psi. In some instances, the dry Mullen Burst strength may be less than or equal to about 250 psi, less than or equal to about 240 psi, less than or equal to about 225 psi, less than or equal to about 200 psi, less than or equal to about 175 psi, less than or equal to about 150 psi, less than or equal to about 125 psi, less than or equal to about 100 psi, less than or equal to about 75 psi, less than or equal to about 50 psi, or less than or equal to about 25 psi. All suitable combinations of the above-referenced ranges are also possible (e.g., greater than or equal to about 20 psi and less than or equal to about 250 psi, greater than or equal to about 30 psi and less than or equal to about 150 psi). Other values of dry Mullen Burst strength are also possible. The dry Mullen Burst strength may be determined according to the standard T403 om-91.

In some embodiments, filtration layer 15 may have a relatively high air permeability. For instance, in some embodiments, the air permeability of the filtration layer comprising synthetic fibers may be greater than or equal to about 50 ft$^3$/min/ft$^2$ (CFM), greater than or equal to about 75 CFM, greater than or equal to about 100 CFM, greater than or equal to about 150 CFM, greater than or equal to about 200 CFM, greater than or equal to about 250 CFM, greater than or equal to about 300 CFM, greater than or equal to about 350 CFM, greater than or equal to about 400 CFM, greater than or equal to about 450 CFM, greater than or equal to about 500 CFM, greater than or equal to 550 CFM, greater than or equal to about 600 CFM, greater than or equal to about 650 CFM, greater than or equal to about 700 CFM, or greater than or equal to about 750 CFM. In some instances, the air permeability of the filtration layer comprising synthetic fibers may be less than or equal to about 800 CFM, less than or equal to about 750 CFM, less than or equal to about 700 CFM, less than or equal to about 650 CFM, less than or equal to about 600 CFM, less than or equal to about 550 CFM, less than or equal to about 500 CFM, less than or equal to about 450 CFM, less than or equal to about 400 CFM, less than or equal to about 350 CFM, less than or equal to about 300 CFM, less than or equal to about 250 CFM, less than or equal to about 200 CFM, less than or equal to about 150 CFM, or less than or equal to about 100 CFM. It should be understood that all suitable combinations of the above-referenced ranges are possible (e.g., greater than or equal to about 50 CFM and less than or equal to about 800 CFM, greater than or equal to about 200 CFM and less than or equal to about 500 CFM).

As used herein, air permeability is measured according to the standard ASTM D737-75. In the air permeability testing apparatus, the sample is clamped on to a test head which provides a circular test area of 38.3 cm$^2$ referred to as nozzle, at a force of at least 50+/−5 N without distorting the sample and with minimum edge leakage. A steady flow of air perpendicular to the sample test area is then supplied providing a pressure differential of 12.5 mm H$_2$O across the material being tested. This pressure differential is recorded from the pressure gauge or manometer connected to the test head. The air permeability through the test area is measured in ft$^3$/min/ft$^2$ using a flow meter or volumetric counter. A Frazier air permeability tester is an example apparatus for such a measurement.

In some embodiments, the filtration layer comprising synthetic fibers may have a relatively small basis weight. For instance, in some embodiments, the filtration layer may have a basis weight of less than or equal to about 110 g/m$^2$, less than or equal to about 100 g/m$^2$, less than or equal to about 97 g/m$^2$, less than or equal to about 95 g/m$^2$, less than or equal to about 92 g/m$^2$, less than or equal to about 90 g/m$^2$, less than or equal to about 87 g/m$^2$, less than or equal to about 85 g/m$^2$, less than or equal to about 82 g/m$^2$, less than or equal to about 80 g/m$^2$, less than or equal to about 70 g/m$^2$, less than or equal to about 60 g/m$^2$, less than or equal to about 50 g/m$^2$, less than or equal to about 40 g/m$^2$, or less than or equal to about 30 g/m$^2$. In some instances, the filtration layer comprising synthetic fibers may have a basis weight of greater than or equal to about 20 g/m$^2$, greater than or equal to about 30 g/m$^2$, greater than or equal to about 40 g/m$^2$, greater than or equal to about 50 g/m$^2$, greater than or equal to about 60 g/m$^2$, greater than or equal to about 70 g/m$^2$, greater than or equal to about 80 g/m$^2$, greater than or equal to about 90 g/m$^2$, or greater than or equal to about 100 g/m$^2$. All suitable combinations of the above-referenced ranges are also possible (e.g., greater than or equal to about 20 g/m$^2$ and less than or equal to about 110 g/m$^2$, greater than or equal to about 20 g/m$^2$ and less than or equal to about 90 g/m$^2$). Other values of basis weight are also possible. The basis weight may be determined according to the standard ASTM D-13776.

In some embodiments, the filtration layer comprising synthetic fibers may be relatively thin. For instance, in some embodiments, the filtration layer comprising synthetic fibers may have a thickness of less than or equal to about 2.0 mm, less than or equal to about 1.8 mm, less than or equal to about 1.5 mm, less than or equal to about 1.2 mm, less than or equal to about 1.0 mm, less than or equal to about 0.8 mm, less than or equal to about 0.7 mm, less than or equal to about 0.6 mm, or less than or equal to about 0.5 mm, or less than or equal to about 0.4 mm. In some instances, the filtration layer comprising synthetic fibers may have a thickness of greater than or equal to about 0.25 mm, greater than or equal to about 0.3 mm, greater than or equal to about 0.4 mm, greater than or equal to about 0.5 mm, greater than or equal to about 0.6 mm, greater than or equal to about 0.8 mm, greater than or equal to about 1.0 mm, greater than or equal to about 1.2 mm, greater than or equal to about 1.5 mm, or greater than or equal to about 1.8 mm. All suitable combinations of the above-referenced ranges are also possible (e.g., greater than or equal to about 0.25 mm and less than or equal to about 2.0 mm, greater than or equal to about 0.4 mm and less than or equal to about 1.0 mm, greater than or equal to about 0.25 mm and less than or equal to about 0.7 mm, greater than or equal to about 0.4 mm and less than or equal to about 0.8 mm). The thickness is determined according to the standard ASTM D1777 at 0.3 psi.

As noted above, the filter media may include a second layer. In some embodiments, the second layer functions to enhance particle capture efficiency of the filter media, and may be referred to as an efficiency layer. Typically, the efficiency layer does not include a spacer layer (e.g., spunbond layer) when referring to the structural and performance characteristics of the efficiency layer, and/or the number of layers within the efficiency layer.

In general, the average efficiency of the second layer and/or the entire filter media may vary based on the application. In some embodiments, the second layer and/or the entire filter media may have DEHS average efficiency at 0.4 microns of greater than or equal to about 10%, greater than or equal to about 20%, greater than or equal to about 35%, greater than or equal to about 50%, greater than or equal to about 60%, greater than or equal to about 70%, greater than or equal to about 80%, greater than or equal to about 90%, greater than or equal to about 95%, greater than or equal to about 97%, greater than or equal to about 99%, greater than or equal to about 99.5%, greater than or equal to about 99.9%, greater than or equal to about 99.95%, greater than or equal to about 99.99%, greater than or equal to about 99.995%, greater than or equal to 99.999%, greater than or equal to 99.9999%, or greater than or equal to 99.99999%. In some instances, the second layer and/or the entire filter media may have DEHS average efficiency at 0.4 microns of less than or equal to 99.99999%, less than or equal to 99.9999%, less than or equal to about 99.999%, less than or equal to about 99.99%, less than or equal to about 99.997%, less than or equal to about 99.995%, less than or equal to about 99.9%, less than or equal to about 99.5%, less than or equal to about 99%, less than or equal to about 98%, less than or equal to about 97%, less than or equal to about 95%, less than or equal to about 90%, less than or equal to about 85%, less than or equal to about 75%, less than or equal to about 60%, less than or equal to about 50%, less than or equal to about 40%, less than or equal to about 30%, less than or equal to about 20%, or less than or equal to about 10%. It should be understood that all suitable combinations of the above-referenced ranges are possible (e.g., greater than or equal to about 20% and less than or equal to about 99.99999%). The DEHS average efficiency may be measured according to EN1822, and for efficiencies <90%, may be measured according to EN779:2012. In some embodiments, the average efficiency of a layer (e.g., second layer) and/or a filter media may be tested following the EN779-2012 standard. The testing uses an air flow of 0.944 m$^3$/s (3400 m$^3$/h) and a maximum final test pressure drop of 250 Pa (e.g., for Coarse or G filter media) or a maximum final test pressure drop of 450 Pa (e.g., for Medium, or M, or Fine, or F, filter media).

As described in more detail below, the second layer (e.g., efficiency layer) may comprise synthetic fibers, amongst other fiber types. In some instances, the second layer may comprise a relatively high weight percentage of synthetic fibers (e.g., 100 wt. %). In some embodiments, the second layer may comprise synthetic fibers formed from a meltblown process, melt spinning process, centrifugal spinning process, or electrospinning process. In some instances, the synthetic fibers may be continuous as described further below. In some embodiments, the second layer may comprise synthetic staple fibers. In some embodiments, the second layer may comprise relatively little (e.g., less than or equal to about 10 wt. %, less than or equal to about 5 wt. %, less than or equal to about 3 wt. %, less than or equal to about 1 wt. %) or no glass fibers.

In some embodiments, the second layer (e.g., efficiency layer) may have an average fiber diameter of less than or equal to about 5 microns, less than or equal to about 4 microns, less than or equal to about 3 microns, less than or equal to about 2 microns, less than or equal to about 1 micron, less than or equal to about 0.9 microns, less than or equal to about 0.8 microns, less than or equal to about 0.7 microns, less than or equal to about 0.6 microns, less than or equal to about 0.5 microns, less than or equal to about 0.4 microns, less than or equal to about 0.3 microns, less than or equal to about 0.2 microns, less than or equal to about 0.1 microns, less than or equal to about 0.08 microns, or less than or equal to about 0.06 microns. In some instances, the average fiber diameter may be greater than or equal to about 0.05 microns, greater than or equal to about 0.06 microns, greater than or equal to about 0.07 microns, greater than or equal to about 0.08 microns, greater than or equal to about 0.09 microns, greater than or equal to about 0.1 micron, greater than or equal to about 0.2 microns, greater than or equal to about 0.3 microns, greater than or equal to about 0.4 microns, greater than or equal to about 0.5 microns, greater than or equal to about 0.8 microns, greater than or equal to about 1 micron, greater than or equal to about 2 microns, greater than or equal to about 3 microns, or greater than or equal to about 4 microns. All suitable combinations of the above-referenced ranges are also possible (e.g., greater than or equal to about 0.05 micron and less than or equal to about 5 microns).

In some embodiments, the fibers in the second layer may have an average length which may depend on the method of formation of the fibers. In some cases, the synthetic fibers may be continuous (e.g., meltblown fibers, spunbond fibers, electrospun fibers, centrifugal spun fibers, etc.). For instance, synthetic fibers may have an average length of at least about 5 cm, at least about 10 cm, at least about 15 cm, at least about 20 cm, at least about 50 cm, at least about 100 cm, at least about 200 cm, at least about 500 cm, at least about 700 cm, at least about 1000, at least about 1500 cm, at least about 2000 cm, at least about 2500 cm, at least about 5000 cm, at least about 10000 cm; and/or less than or equal to about 10000 cm, less than or equal to about 5000 cm, less than or equal to about 2500 cm, less than or equal to about 2000 cm, less than or equal to about 1000 cm, less than or equal to about 500 cm, or less than or equal to about 200 cm. All suitable combinations of the above-referenced ranges are also possible (e.g., greater than or equal to about 100 cm and less than or equal to about 2500 cm). Other values of average fiber length are also possible.

In other embodiments, the synthetic fibers are not continuous (e.g., staple fibers). In general, synthetic non-continuous fibers may be characterized as being shorter than continuous synthetic fibers. For instance, in some embodiments, the fibers in the second layer may have an average length of greater than or equal to about 0.1 mm, greater than or equal to about 0.3 mm, greater than or equal to about 0.5 mm, greater than or equal to about 0.8 mm, greater than or equal to about 1 mm, greater than or equal to about 3 mm, greater than or equal about 6 mm, greater than or equal about 9 mm, greater than or equal about 12 mm, greater than or equal about 15 mm, greater than or equal about 18 mm, greater than or equal about 20 mm, greater than or equal about 22 mm, greater than or equal about 25 mm, greater than or equal about 28 mm, greater than or equal about 30 mm, greater than or equal about 32 mm, greater than or equal about 35 mm, greater than or equal about 38 mm, greater than or equal about 40 mm, greater than or equal about 42 mm, or greater than or equal about 45 mm. In some instances, the average length of the fibers in the second layer may be less than or equal to about 50 mm, less than or equal to about 48 mm, less than or equal to about 45 mm, less than or equal to about 42 mm, less than or equal to about 40 mm, less than or equal to about 38 mm, less than or equal to about 35 mm, less than or equal to about 32 mm, less than or equal to about 30 mm, less than or equal to about 27 mm, less than or equal to about 25 mm, less than or equal to about 22 mm, less than or equal to about 20 mm, less than or equal to about 18 mm, less than or equal to about 15 mm, less than or equal to about 12 mm, less than or equal to about 9 mm, less than or equal to about 6 mm, less than or equal to about 3 mm, or less than or equal to about 1 mm. All suitable combinations of the above-referenced ranges are also possible (e.g., greater than or equal about 0.1 mm and less than or equal to about 30 mm, greater than or equal about 0.3 mm and less than or equal to about 12 mm).

In some embodiments, in which synthetic fibers are included in the second layer, the weight percentage of synthetic fibers in the second layer and/or in the weight percentage of synthetic fibers of all fibers in the second layer may be greater than or equal to about 1%, greater than or equal to about 20%, greater than or equal to about 40%, greater than or equal to about 60%, greater than or equal to about 80%, greater than or equal to about 90%, or greater than or equal to about 95%. In some instances, the weight percentage of synthetic fibers and/or in the weight percentage of synthetic fibers of all fibers in the second layer in the second layer may be less than or equal to about 100%, less than or equal to about 98%, less than or equal to about 85%, less than or equal to about 75%, less than or equal to about 50%, less than or equal to about 25%, or less than or equal to about 10%. All suitable combinations of the above-referenced ranges are also possible (e.g., greater than or equal to about 80% and less than or equal to about 100%). Other values of weight percentage of synthetic fibers in the second layer are also possible. In some embodiments, the second layer includes 100% synthetic fibers.

In some embodiments, the second layer (e.g., efficiency layer) may have a basis weight of less than or equal to about 120 $g/m^2$, less than or equal to about 100 $g/m^2$, less than or equal to about 75 $g/m^2$, less than or equal to about 50 $g/m^2$, less than or equal to about 35 $g/m^2$, less than or equal to about 25 $g/m^2$, less than or equal to about 20 $g/m^2$, less than or equal to about 15 $g/m^2$, less than or equal to about 10 $g/m^2$, less than or equal to about 5 $g/m^2$, less than or equal to about 1 $g/m^2$, less than or equal to about 0.8 $g/m^2$, less than or equal to about 0.5 $g/m^2$, less than or equal to about 0.1 $g/m^2$, less than or equal to about 0.08 $g/m^2$, or less than or equal to about 0.06 $g/m^2$. In some instances, the second layer may have a basis weight of greater than or equal to about 0.05 $g/m^2$, greater than or equal to about 0.06 $g/m^2$, greater than or equal to about 0.08 $g/m^2$, greater than or equal to about 0.1 $g/m^2$, greater than or equal to about 0.2 $g/m^2$, greater than or equal to about 0.5 $g/m^2$, greater than or equal to about 0.8 $g/m^2$, greater than or equal to about 1 $g/m^2$, greater than or equal to about 5 $g/m^2$, greater than or equal to about 10 $g/m^2$, greater than or equal to about 15 $g/m^2$, greater than or equal to about 20 $g/m^2$, greater than or equal to about 30 $g/m^2$, greater than or equal to about 40 $g/m^2$, greater than or equal to about 50 $g/m^2$, greater than or equal to about 60 $g/m^2$, greater than or equal to about 70 $g/m^2$, greater than or equal to about 80 $g/m^2$, greater than or equal to about 90 $g/m^2$, or greater than or equal to about 100 $g/m^2$. All suitable combinations of the above-referenced ranges are also possible (e.g., greater than or equal to about 0.05 $g/m^2$ and less than or equal to about 75 $g/m^2$, greater than or equal to about 0.05 $g/m^2$ and less than or equal to about 120 $g/m^2$). Other values of basis weight are also possible. The basis weight is determined according to the standard ASTM D-13776.

In some embodiments, the second layer may have a thickness of less than or equal to about 5 mm, less than or equal to about 4.5 mm, less than or equal to about 4 mm, less than or equal to about 3.5 mm, less than or equal to about 3 mm, less than or equal to about 2.5 mm, less than or equal to about 2 mm, less than or equal to about 1.5 mm, less than or equal to about 1 mm, less than or equal to about 0.5 mm, less than or equal to about 0.1 mm, less than or equal to about 0.05 mm, or less than or equal to about 0.01 mm. In some instances, the second layer may have a thickness of greater than or equal to about 0.001 mm, greater than or equal to about 0.005 mm, greater than or equal to about 0.01 mm, greater than or equal to about 0.05 mm, greater than or equal to about 0.08 mm, greater than or equal to about 0.1 mm, greater than or equal to about 0.5 mm, greater than or equal to about 1 mm, greater than or equal to about 1.5 mm, greater than or equal to about 2 mm, greater than or equal to about 2.5 mm, greater than or equal to about 3 mm, greater than or equal to about 3.5 mm, or greater than or equal to about 4 mm. All suitable combinations of the above-referenced ranges are also possible (e.g., greater than or equal to about 0.005 mm and less than or equal to about 5 mm, greater than or equal to about 0.01 mm and less than or equal to about 1 mm). Other values of average thickness are also possible. The thickness may be determined according to the standard ASTM D1777 at 0.3 psi.

In certain embodiments, the second layer (e.g., an efficiency layer) may include a single layer. In other embodiments, however, the second layer may include more than one layer (i.e., sub-layers) to form a multi-layered structure. When a layer includes more than one sub-layer, the plurality of sub-layers may differ based on certain features such as air permeability, basis weight, fiber type, and/or particulate efficiency. In certain cases, the plurality of sub-layers may be discrete and combined by any suitable method, such as lamination, point bonding, or collating. In some embodiments, the sub-layers are substantially joined to one another (e.g., by lamination, point bonding, thermo-dot bonding, ultrasonic bonding, calendering, use of adhesives (e.g., glue-web), and/or co-pleating). In some cases, sub-layers may be formed as a composite layer (e.g., by a wet laid process).

In some embodiments, the efficiency layer may be electrostatically charged. Electrostatic charge may be imparted to the second efficiency layer or the filter media using methods known to those of ordinary skill in the art including, but not limited to, corona charging, charge bars, hydroentangling charging, triboelectric charging, hydrocharging, or use of additives. In other embodiments, the efficiency layer may not be charged.

A filter media having the filtration layer comprising synthetic fibers described herein may exhibit advantageous and enhanced filtration performance characteristics, such as dust holding capacity (DHC) and efficiency.

Filter media described herein may have a relatively high dust holding capacity. The dust holding capacity is the difference in the weight of the filter media before exposure to a certain amount of fine dust and the weight of the filter media after the exposure to the fine dust, upon reaching a particular pressure drop across the filter media, divided by the area of the fiber web. Dust holding capacity may be determined according to the weight (mg) of dust captured per square cm of the media (e.g., through a 100 $cm^2$ test area). As determined herein, dust holding capacity is measured using aerosol of atomized salt (e.g., KCl) particles using an ASHRAE 52.2 flat sheet test rig tested at 15 fpm velocity where the final pressure drop when the dust holding capacity is measured is 1.5 inches of $H_2O$ on a column. The dust holding capacity may be determined using the ASHRAE 52.2 standard.

In some embodiments, the filter media may have a dust holding capacity of greater than or equal to about 10 $g/m^2$, greater than or equal to about 20 $g/m^2$, greater than or equal to about 25 $g/m^2$, greater than or equal to about 50 $g/m^2$, greater than or equal to about 75 $g/m^2$, greater than or equal to about 100 $g/m^2$, greater than or equal to about 125 $g/m^2$, greater than or equal to about 150 $g/m^2$, greater than or equal to about 175 $g/m^2$, greater than or equal to about 200 $g/m^2$, greater than or equal to about 225 $g/m^2$, greater than or equal to about 250 $g/m^2$, or greater than or equal to about 275 $g/m^2$. In some instances, the dust holding capacity may be less than or equal to about 300 $g/m^2$, less than or equal to about 275 $g/m^2$, less than or equal to about 250 $g/m^2$, less than or equal to about 225 $g/m^2$, less than or equal to about 200 g/m², less than or equal to about 175 g/m², less than or equal to about 150 g/m², less than or equal to about 125 g/m², less than or equal to about 100 g/m², less than or equal to about 80 g/m², less than or equal to about 60 g/m², or less than or equal to about 50 g/m². All suitable combinations of the above-referenced ranges are possible (e.g., greater than or equal to about 10 g/m² and less than or equal to about 300 g/m², greater than or equal to about 20 g/m² and less than or equal to about 80 g/m²).

In some embodiments, the average efficiency of a layer (e.g., second layer) and/or filter media increases as a function of particle size. In some embodiments, the average efficiency may be greater than or equal to about 20% and less than or equal to about 100% (e.g., greater than or equal to about 40% and less than or equal to about 100%) for 0.3-1.0 micron-sized particles, for 1.0-3.0 micron-sized particles, or 3.0-10.0 micron-sized particles. For instance, in certain embodiments, the average efficiency of a filtration layer (e.g., second layer) and/or filter media may be greater than or equal to about 10%, greater than or equal to about 20%, greater than or equal to about 35%, greater than or equal to about 50%, greater than or equal to about 60%, greater than or equal to about 70%, greater than or equal to about 80%, greater than or equal to about 90%, greater than or equal to about 95%, greater than or equal to about 97%, greater than or equal to about 99%, greater than or equal to about 99.5%, greater than or equal to about 99.9%, greater than or equal to about 99.95%, greater than or equal to about 99.99%, or greater than or equal to about 99.995% for 0.3-1.0 micron-sized particles, for 1.0-3.0 micron-sized particles, or 3.0-10.0 micron-sized particles. In some embodiments, the average efficiency may be less than or equal to about 100%, less than or equal to about 99.999%, less than or equal to about 99.99%, less than or equal to about 99.997%, less than or equal to about 99.995%, less than or equal to about 99.9%, less than or equal to about 99.5%, less than or equal to about 99%, less than or equal to about 98%, less than or equal to about 97%, less than or equal to about 95%, less than or equal to about 90%, less than or equal to about 85%, less than or equal to about 75%, less than or equal to about 60%, less than or equal to about 50%, less than or equal to about 40%, less than or equal to about 30%, less than or equal to about 20%, or less than or equal to about 10% for 0.3-1.0 micron-sized particles, for 1.0-3.0 micron-sized particles, or 3.0-10.0 micron-sized particles. It should be understood that all suitable combinations of the above-referenced ranges are possible (e.g., greater than or equal to about 20% and less than or equal to about 100%). The average efficiency as a function of particle size may be determined according to EN 1822. In some embodiments, the average efficiency of a mechanical efficiency layer and/or filter media may be tested using EN 1822.

In some embodiments, the average efficiency of the second layer or filter media may be tested following the ASHRAE 52.2 standard. For instance, the average efficiency of a charged efficiency layer and/or filter media may be tested using ASHRAE 52.2 standard. The testing uses a test air flow rate of 25 FPM. The test is run at an air temperature of 69° F., a relative humidity of 25%, and a barometric pressure of 29.30 in Hg. The testing also uses a challenge aerosol of atomized salt (e.g., KCl) particles having a range of particle sizes between 0.3-1.0 microns, 1.0-3.0 microns, or 3.0-10.0 microns.

In certain embodiments, the second layer (e.g., efficiency layer) and/or filter media described herein may be classified by a MERV (Minimum Efficiency Reporting Value) rating based on the results of the ASHRAE 52.2 efficiency. MERV ratings are generally used by the HVAC (Heating, Ventilating, and Air Conditioning) industry to describe a filter's ability to remove particulates from the air. A higher MERV rating means better filtration and greater performance. In some embodiments, the second layer or filter media described herein has a MERV rating that is in the range of about 5 to 12 (e.g., between about 8 and 12, between about 6 and 9), however the rating can vary based on the intended use. In some embodiments, a filtration layer or filter media described herein has a MERV rating of greater than or equal to about 5, greater than or equal to about 6, greater than or equal to about 7, greater than or equal to about 8, greater than or equal to about 9, greater than or equal to about 10, greater than or equal to about 11, or greater than or equal to about 12. The MERV rating may be, for example, less than or equal to 15, less than or equal to 14, less than or equal to 13, less than or equal to 12, less than or equal to 11, or less than or equal to 10. It should be understood that all suitable combinations of the above-referenced ranges are possible (e.g., greater than or equal to about 5 and less than or equal to about 15).

In some embodiments, the air permeability of the filter media may be greater than or equal to about 1 CFM, greater than or equal to about 5 CFM, greater than or equal to about 10 CFM, greater than or equal to about 25 CFM, greater than or equal to about 50 CFM, greater than or equal to about 75 CFM, greater than or equal to about 100 CFM, greater than or equal to 125 CFM, greater than or equal to about 150 CFM, greater than or equal to about 175 CFM, greater than or equal to about 200 CFM, greater than or equal to 225 CFM, greater than or equal to about 250 CFM, or greater than or equal to about 275 CFM. In some instances, the air permeability of the filter media may be less than or equal to about 300 CFM, less than or equal to about 275 CFM, less than or equal to about 250 CFM, less than or equal to about 225 CFM, less than or equal to about 200 CFM, less than or equal to about 175 CFM, less than or equal to about 150 CFM, less than or equal to about 125 CFM, less than or equal to about 100 CFM, less than or equal to about 75 CFM, less than or equal to about 50 CFM, or less than or equal to about 25 CFM. It should be understood that all suitable combinations of the above-referenced ranges are possible (e.g., greater than or equal to about 1 CFM and less than or equal to about 300 CFM, greater than or equal to about 10 CFM and less than or equal to about 250 CFM).

In some embodiments, the filter media may have a relatively low pressure drop. For instance, in some embodiments, the filter media may have a pressure drop of less than or equal to about 1,300 Pa, less than or equal to about 1,200 Pa, less than or equal to about 1,000 Pa, less than or equal to about 750 Pa, less than or equal to about 500 Pa, less than or equal to about 250 Pa, less than or equal to about 150 Pa, less than or equal to about 130 Pa, less than or equal to about 100 Pa, less than or equal to about 80 Pa, less than or equal to about 60 Pa, less than or equal to about 40 Pa, less than or equal to about 20 Pa, or less than or equal to about 10 Pa. In some instances, the filter media may have a pressure drop of greater than or equal to about 4 Pa, greater than or equal to about 6 Pa, greater than or equal to about 10 Pa, greater than or equal to about 20 Pa, greater than or equal to about 40 Pa, greater than or equal to about 60 Pa, greater than or equal to about 80 Pa, greater than or equal to about 100 Pa, greater than or equal to about 150 Pa, greater than or equal to about 250 Pa, greater than or equal to about 500 Pa, greater than or equal to about 750 Pa, greater than or equal to about 1,000 Pa, or greater than or equal to about 1,250 Pa. All suitable combinations of the above-referenced ranges are also possible (e.g., greater than or equal to about 4 Pa and less than or equal to about 1,300 Pa, greater than or equal to about 6 Pa and less than or equal to about 130 Pa). The pressure drop, as described herein, can be determined at 10.5 FPM face velocity using a TSI 8130 filtration tester, according to ISO 3968.

In some embodiments, the filter media may have a basis weight of greater than or equal to about 20 g/m$^2$, greater than or equal to about 25 g/m$^2$, greater than or equal to about 50 g/m$^2$, greater than or equal to about 75 g/m$^2$, greater than or equal to about 100 g/m$^2$, greater than or equal to about 125 g/m$^2$, greater than or equal to about 150 g/m$^2$, or greater than or equal to about 175 g/m$^2$. In some instances, the filter media may have a basis weight of less than or equal to about 200 g/m$^2$, less than or equal to about 175 g/m$^2$, less than or equal to about 150 g/m$^2$, less than or equal to about 125 g/m$^2$, less than or equal to about 100 g/m$^2$, less than or equal to about 75 g/m$^2$, less than or equal to about 50 g/m$^2$, less than or equal to about 40 g/m$^2$, or less than or equal to about 30 g/m$^2$. All suitable combinations of the above-referenced ranges are also possible (e.g., greater than or equal to about 20 g/m$^2$ and less than or equal to about 200 g/m$^2$, greater than or equal to about 25 g/m$^2$ and less than or equal to about 125 g/m$^2$). Other values of basis weight are also possible. The basis weight may be determined according to the standard ASTM D-13776.

In some embodiments, the filter media may have a thickness of greater than or equal to about 0.25 mm, greater than or equal to about 0.3 mm, greater than or equal to about 0.4 mm, greater than or equal to about 0.5 mm, greater than or equal to about 0.6 mm, greater than or equal to about 0.8 mm, greater than or equal to about 1.0 mm, greater than or equal to about 1.2 mm, greater than or equal to about 1.5 mm, greater than or equal to about 1.8 mm, greater than or equal to about 2.0 mm, or greater than or equal to about 2.2 mm. In some instances, the filter media may have a thickness of less than or equal to about 2.5 mm, less than or equal to about 2.2 mm, less than or equal to about 2.0 mm, less than or equal to about 1.8 mm, less than or equal to about 1.5 mm, less than or equal to about 1.2 mm, less than or equal to about 1.0 mm, less than or equal to about 0.8 mm, less than or equal to about 0.6 mm, less than or equal to about 0.5 mm, or less than or equal to about 0.4 mm. All suitable combinations of the above-referenced ranges are also possible (e.g., greater than or equal to about 0.25 mm and less than or equal to about 2.5 mm, greater than or equal to about 0.4 mm and less than or equal to about 1.2 mm). The thickness is determined according to the standard ASTM D1777 at 0.3 psi.

In some embodiments, the filtration layer comprising synthetic fibers may comprise a relatively high weight percentage of the filter media (e.g., greater than or equal to about 65 wt. %). In certain embodiments, the weight percentage of the filtration layer comprising synthetic fibers in the filter media may be greater than or equal to about 65 wt. %, greater than or equal to about 70 wt. %, greater than or equal to about 75 wt. %, greater than or equal to about 80 wt. %, greater than or equal to about 85 wt. %, greater than or equal to about 90 wt. %, greater than or equal to about 92 wt. %, greater than or equal to about 95 wt. %, greater than or equal to about 97 wt. %, or greater than or equal to about 99 wt. %. In some instances, the weight percentage of the filtration layer comprising synthetic fibers in the filter media may be less than or equal to about 99.5 wt. %, less than or equal to about 99 wt. %, less than or equal to about 98 wt. %, less than or equal to about 97 wt. %, less than or equal to about 95 wt. %, less than or equal to about 92 wt. %, less than or equal to about 90 wt. %, less than or equal to about 85 wt. %, less than or equal to about 80 wt. %, less than or equal to about 75 wt. %, or less than or equal to about 70 wt. %. All suitable combinations of the above-referenced ranges are also possible (e.g., greater than or equal to about 65 wt. % and less than or equal to about 99.5 wt. %, greater than or equal to about 80 wt. % and less than or equal to about 95 wt. %).

In some embodiments, the filter media may comprise a relatively high weight percentage of coarse diameter fibers. In certain embodiments, the total weight percentage of coarse diameter fibers in the filter media and/or in the total weight percentage of coarse diameter fibers of all fibers in the filter media may be greater than or equal to about 20 wt. %, greater than or equal to about 30 wt. %, greater than or equal to about 40 wt. %, greater than or equal to about 50 wt. %, greater than or equal to about 60 wt. %, greater than or equal to about 70 wt. %, or greater than or equal to about 80 wt. %. In some instances, the total weight percentage of coarse diameter fibers in the filter media and/or in the total weight percentage of coarse diameter fibers of all fibers in the filter media may be less than or equal to about 85 wt. %, less than or equal to about 80 wt. %, less than or equal to about 70 wt. %, less than or equal to about 60 wt. %, less than or equal to about 50 wt. %, less than or equal to about 40 wt. %, less than or equal to about 30 wt. %, less than or equal to about 20 wt. %, or less than or equal to about 15 wt. %. All suitable combinations of the above-referenced ranges are also possible (e.g., greater than or equal to about 20 wt. % and less than or equal to about 85 wt. %, greater than or equal to about 40 wt. % and less than or equal to about 70 wt. %).

In certain embodiments, the total weight percentage of fine diameter fibers in the filter media and/or in the total weight percentage of fine diameter fibers of all fibers in the filter media may be less than or equal to about 40 wt. %, less than or equal to about 35 wt. %, less than or equal to about 30 wt. %, less than or equal to about 25 wt. %, less than or equal to about 20 wt. %, less than or equal to about 15 wt. %, or less than or equal to about 10 wt. %. In some instances, the total weight percentage of fine diameter fibers in the filtration layer comprising synthetic fibers and/or in the total weight percentage of fine diameter fibers of all fibers in the filter media may be greater than or equal to about 5 wt. %, greater than or equal to about 10 wt. %, greater than or equal to about 15 wt. %, greater than or equal to about 20 wt. %, greater than or equal to about 25 wt. %, greater than or equal to about 30 wt. %, or greater than or equal to about 35 wt. %. All suitable combinations of the above-referenced ranges are also possible (e.g., greater than or equal to about 5 wt. % and less than or equal to about 40 wt. %, greater than or equal to about 10 wt. % and less than or equal to about 20 wt. %).

In some embodiments, the filter media may contain a relatively high weight percentage of synthetic fibers. For instance, in some embodiments, the weight percentage of synthetic fibers in the filter media and/or in the weight percentage of synthetic fibers of all fibers in the filter media may be greater than or equal to about 1%, greater than or equal to about 20%, greater than or equal to about 40%, greater than or equal to about 60%, greater than or equal to about 80%, greater than or equal to about 90%, or greater than or equal to about 95%. In some instances, the weight percentage of synthetic fibers in the filter media and/or in the weight percentage of synthetic fibers of all fibers in the filter media may be less than or equal to about 100%, less than or equal to about 98%, less than or equal to about 85%, less than or equal to about 75%, less than or equal to about 50%, or less than or equal to about 10%. All suitable combinations of the above-referenced ranges are also possible (e.g., greater than or equal to about 80% and less than or equal to about 100%). In some embodiments, the filter media includes 100% synthetic fibers.

In some embodiments, one or more layers (e.g., filtration layer comprising synthetic fibers, second layer) and/or the entire filter media is substantially free of glass fibers (e.g., less than 1 wt. % glass fibers, between about 0 wt. % and about 1 wt. % glass fibers). For instance, the filtration layer comprising synthetic fibers, second layer, and/or the entire filter media may include 0 wt. % glass fibers.

Filter media described herein may be produced using suitable processes, such a wet laid or a non-wet laid process. In some embodiments, the filtration layer comprising synthetic fibers and/or the filter media described herein may be produced using a wet laid process. In general, a wet laid process involves mixing together of fibers of one or more type; for example, coarse synthetic fibers of one diameter may be mixed together with coarse synthetic fibers of another diameter, and/or with fine diameter fibers, to provide a fiber slurry. The slurry may be, for example, an aqueous-based slurry. In certain embodiments, fibers, are optionally stored separately, or in combination, in various holding tanks prior to being mixed together (e.g., to achieve a greater degree of uniformity in the mixture).

For instance, a first fiber may be mixed and pulped together in one container and a second fiber may be mixed and pulped in a separate container. The first fibers and the second fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components may also be introduced into the mixture. Furthermore, it should be appreciated that other combinations of fibers types may be used in fiber mixtures, such as the fiber types described herein.

In certain embodiments, a media including two or more layers, such as a filtration layer comprising synthetic fibers and a second layer is formed by a wet laid process. For example, a first dispersion (e.g., a pulp) containing fibers in a solvent (e.g., an aqueous solvent such as water) can be applied onto a wire conveyor in a papermaking machine (e.g., a fourdrinier or a rotoformer) to form first layer supported by the wire conveyor. A second dispersion (e.g., another pulp) containing fibers in a solvent (e.g., an aqueous solvent such as water) is applied onto the first layer either at the same time or subsequent to deposition of the first layer on the wire. Vacuum is continuously applied to the first and second dispersions of fibers during the above process to remove the solvent from the fibers, thereby resulting in an article containing first and second layers. The article thus formed is then dried and, if necessary, further processed (e.g., calendered) by using known methods to form multi-layered filter media.

Other wet laid processes may also be suitable. Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.1% and 0.5% by weight.

In some cases, the pH of the fiber slurry may be adjusted as desired. For instance, fibers of the slurry may be dispersed under generally neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder, or an inclined wire fourdrinier.

In some embodiments, a resin is added to a layer (e.g., a pre-formed layer formed by a wet-laid process). For instance, as the layer is passed along an appropriate screen or wire, different components included in the resin (e.g., polymeric binder and/or other components), which may be in the form of separate emulsions, are added to the fiber layer using a suitable technique. In some cases, each component of the resin is mixed as an emulsion prior to being combined with the other components and/or layer. The components included in the resin may be pulled through the layer using, for example, gravity and/or vacuum. In some embodiments, one or more of the components included in the resin may be diluted with softened water and pumped into the layer. In some embodiments, a resin may be applied to a fiber slurry prior to introducing the slurry into a headbox. For example, the resin may be introduced (e.g., injected) into the fiber slurry and impregnated with and/or precipitated on to the fibers. In some embodiments, a resin may be added to a layer by a solvent saturation process.

In some embodiments, the second layer described herein may be produced using a non-wet laid process, such as blowing or spinning process. In some embodiments, the second layer may be formed by an electrospinning process. In certain embodiments, the second layer may be formed by a meltblowing system, such as the meltblown system described in U.S. Publication No. 2009/0120048, filed Nov. 7, 2008, and entitled "Meltblown Filter Medium", and U.S. Publication No. 2012-0152824, filed Dec. 17, 2010, and entitled, "Fine Fiber Filter Media and Processes", each of which is incorporated herein by reference in its entirety for all purposes. In certain embodiments, the second layer may be formed by a meltspinning or a centrifugal spinning process. In some embodiments, a non-wet laid process, such as an air laid or carding process, may be used to form the second layer. For example, in an air laid process, synthetic fibers may be mixed, while air is blown onto a conveyor. In a carding process, in some embodiments, the fibers are manipulated by rollers and extensions (e.g., hooks, needles) associated with the rollers. In some cases, forming the layers through a non-wet laid process may be more suitable for the production of a highly porous media. The layer may be impregnated (e.g., via saturation, spraying, etc.) with any suitable resin, as discussed above. In some embodiments, a non-wet laid process (e.g., meltblown, electrospun) may be used to form the second layer and a wet laid process may be used to form the filtration layer comprising synthetic fibers. The second layer (e.g., efficiency layer) and the filtration layer comprising synthetic fibers may be combined using any suitable process (e.g., adhesives, lamination, co-pleating, or collation).

During or after formation of a filter media, the filter media may be further processed according to a variety of known techniques. For instance, a coating method may be used to include a resin in the filter media. Optionally, additional layers can be formed and/or added to a filter media using processes such as adhesives, lamination, co-pleating, or collation. For example, in some cases, two layers (e.g., filtration layer comprising synthetic fibers and the second layer) are formed into a composite article by a wet laid process as described above, and the composite article is then combined with a third layer by any suitable process (e.g., adhesives, lamination, co-pleating, or collation). It can be appreciated that a filter media or a composite article formed by the processes described herein may be suitably tailored not only based on the components of each layer, but also according to the effect of using multiple layers of varying properties in appropriate combination to form filter media having the characteristics described herein.

As described herein, in some embodiments two or more layers of the filter media (e.g., filtration layer comprising synthetic fibers and the second layer) may be formed separately and combined by any suitable method such as lamination, collation, or by use of adhesives. The two or more layers may be formed using different processes, or the same process. For example, each of the layers may be independently formed by a non-wet laid process (e.g., meltblown process, melt spinning process, centrifugal spinning process, electrospinning process, dry laid process, air laid process), a wet laid process, or any other suitable process.

Different layers may be adhered together by any suitable method. For instance, layers may be adhered by an adhesive and/or melt-bonded to one another on either side. Lamination and calendering processes may also be used. In some embodiments, an additional layer may be formed from any type of fiber or blend of fibers via an added headbox or a coater and appropriately adhered to another layer.

In some embodiments, further processing may involve pleating the filter media. For instance, two layers may be joined by a co-pleating process. In some cases, the filter media, or various layers thereof, may be suitably pleated by forming score lines at appropriately spaced distances apart from one another, allowing the filter media to be folded. In some cases, one layer can be wrapped around a pleated layer. It should be appreciated that any suitable pleating technique may be used.

In some embodiments, a filter media can be post-processed such as subjected to a corrugation process to increase surface area within the web. In other embodiments, a filter media may be embossed.

The filter media may include any suitable number of layers, e.g., at least 2, at least 3, at least 4, at least 5, at least 6, at least 7 layers. In some embodiments, the filter media may include up to 20 layers.

Filter media described herein may be used in an overall filtration arrangement or filter element. In some embodiments, one or more additional layers or components are included with the filter media. Non-limiting examples of additional layers (e.g., a third layer, a fourth layer) include a meltblown layer, a wet laid layer, a spunbond layer, a carded layer, an air-laid layer, a spunlace layer, a forcespun layer or an electrospun layer.

It should be appreciated that the filter media may include other parts in addition to the one or more layers described herein. In some embodiments, further processing includes incorporation of one or more structural features and/or stiffening elements. For instance, the filter media may be combined with additional structural features such as polymeric and/or metallic meshes. In one embodiment, a screen backing may be disposed on the filter media, providing for further Gurley stiffness. In some cases, a screen backing may aid in retaining the pleated configuration. For example, a screen backing may be an expanded metal wire or an extruded plastic mesh.

In some embodiments, a layer described herein may be a non-woven web. A non-woven web may include non-oriented fibers (e.g., a random arrangement of fibers within the web). Examples of non-woven webs include webs made by wet-laid or non-wet laid processes as described herein.

The filter media may be incorporated into a variety of suitable filter elements for use in various applications including gas and liquid filtration. Filter media suitable for gas filtration may be used for HVAC, HEPA, face mask, and ULPA filtration applications. For example, the filter media may be used in heating and air conditioning ducts. In another example, the filter media may be used for respirator and face mask applications (e.g., surgical face masks, industrial face masks, and industrial respirators). The filter media can be incorporated into a variety of filter elements for use in hydraulic filtration applications. Exemplary uses of hydraulic filters (e.g., high-, medium-, and low-pressure specialty filters) include mobile and industrial filters.

Filter elements may have any suitable configuration as known in the art including bag filters and panel filters. Filter assemblies for filtration applications can include any of a variety of filter media and/or filter elements. The filter elements can include the above-described filter media. Examples of filter elements include gas turbine filter elements, dust collector elements, heavy duty air filter elements, automotive air filter elements, air filter elements for large displacement gasoline engines (e.g., SUVs, pickup trucks, trucks), HVAC air filter elements, HEPA filter elements, ULPA filter elements, vacuum bag filter elements, fuel filter elements, and oil filter elements (e.g., lube oil filter elements or heavy duty lube oil filter elements).

Filter elements can be incorporated into corresponding filter systems (gas turbine filter systems, heavy duty air filter systems, automotive air filter systems, HVAC air filter systems, HEPA filter systems, ULPA filter system, vacuum bag filter systems, fuel filter systems, and oil filter systems). The filter media can optionally be pleated into any of a variety of configurations (e.g., panel, cylindrical).

Filter elements can also be in any suitable form, such as radial filter elements, panel filter elements, or channel flow elements. A radial filter element can include pleated filter media that are constrained within two open wire meshes in a cylindrical shape. During use, fluids can flow from the outside through the pleated media to the inside of the radial element.

In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame has a generally rectangular configuration surrounding all four sides of a generally rectangular filter media. The frame may be formed from various materials, including for example, cardboard, metal, polymers, or any combination of suitable materials. The filter elements may also include a variety of other features known in the art, such as stabilizing features for stabilizing the filter media relative to the frame, spacers, or any other appropriate feature.

As noted above, in some embodiments, the filter media can be incorporated into a bag (or pocket) filter element. A bag filter element may be formed by any suitable method, e.g., by placing two filter media together (or folding a single filter media in half), and mating three sides (or two if folded) to one another such that only one side remains open, thereby forming a pocket inside the filter. In some embodiments, multiple filter pockets may be attached to a frame to form a filter element. It should be understood that the filter media and filter elements may have a variety of different constructions and the particular construction depends on the application in which the filter media and elements are used. In some cases, a substrate may be added to the filter media.

The filter elements may have the same property values as those noted above in connection with the filter media. For example, the above-noted pressure drop, thicknesses, and/or basis weight may also be found in filter elements.

During use, the filter media mechanically trap contaminant particles on the filter media as fluid (e.g., air) flows through the filter media. The filter media need not be electrically charged to enhance trapping of contamination. Thus, in some embodiments, the filter media are not electrically charged. However, in some embodiments, the filter media may be electrically charged. In some embodiments, the filtration layer comprising synthetic fibers (e.g., pleatable backer layer) and/or the filter media may be used for non-filtration application. For example, the filtration layer comprising synthetic fibers (e.g., pleatable backer layer) and/or the filter media may be used in window shade applications.

EXAMPLES

This example describes the dust holding capacity for five filter media including a meltblown efficiency layer adhesively bound to a filtration layer comprising synthetic fibers. In this example, the filtration layer comprising synthetic fibers was a pleatable backer layer. The surface average fiber diameter of the pleatable backer layer varied in each filter media. Optimal dust holding capacity was observed when the surface average fiber diameter (SAFD) was in the range of 13 microns to 17 microns.

Filter media containing a metblown efficiency layer and a pleatable backer layer were formed. The pleatable backer layer was upstream and directly adjacent to the meltblown efficiency layer. The efficiency layer was a meltblown polypropylene fiber web having an average fiber diameter of 0.6 microns. The efficiency layer was a mechanical efficiency layer with an F9 efficiency rating according to the EN779 standard. The pleatable backer layer contained a blend of a first population of coarse polyester fibers having an average diameter of 25 microns, a second population of coarse polyester fibers having an average diameter of 15 microns, a first population of fine polyester fibers having an average fiber diameter of 9 microns, and a second population of fine polyester fibers having an average fiber diameter of 13 microns, and an acrylic binder. The pleatable backer layers were formed via a wetlaid process and had a basis weight between about 80 g/m² and 85 g/m². Table 1 shows the weight percentage of total fibers for each fiber type in the pleatable backer layer as well as the surface average fiber diameter and air permeability. The surface average fiber diameter was calculated as described herein. Unless otherwise indicated, the structural and performance properties of the layers and entire filter were measured as described herein.

TABLE 1

Pleatable Backer Layer Properties.

| Sample | Wt. % 25 microns | Wt. % 15 microns | Wt. % 13 microns | Wt. % 9 microns | SAFD microns) | Air Perm. (CFM) |
|---|---|---|---|---|---|---|
| 1 | 0 | 7 | 0 | 93 | 8.1 | 117 |
| 2 | 31.5 | 7 | 10.5 | 51 | 11.0 | 202 |
| 3 | 47.2 | 7 | 15.8 | 30 | 13.5 | 260 |
| 4 | 54.8 | 7 | 18.2 | 20 | 15.0 | 352 |
| 5 | 60 | 7 | 20 | 13 | 16.4 | 399 |

Figure 2:
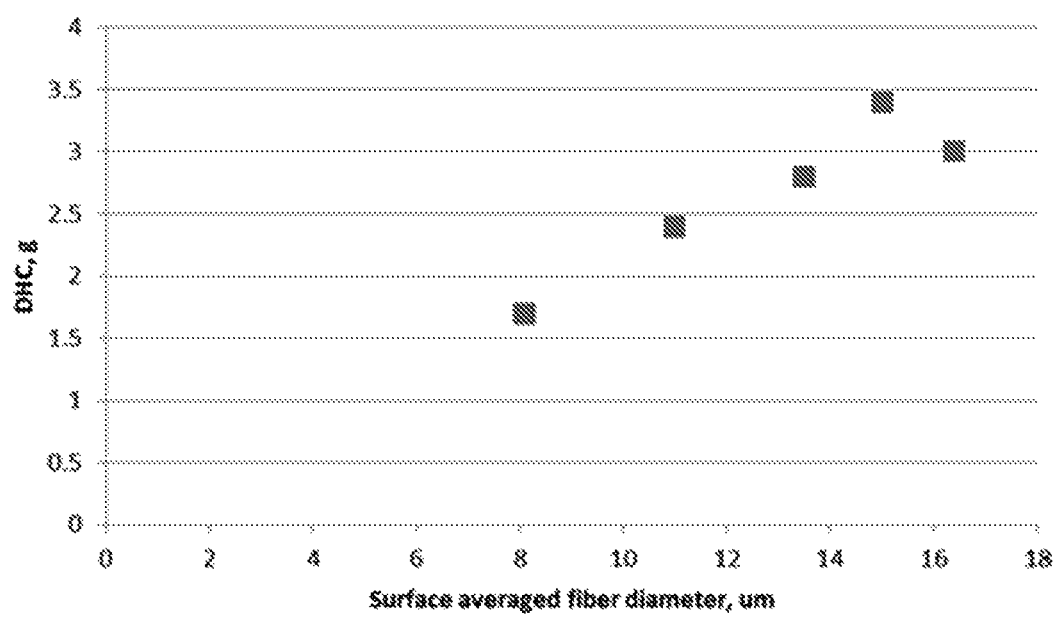
FIG. 2 shows a graph of dust holding capacity versus surface average fiber diameter for various filter media.

Five different pleatable backer layers were combined with the efficiency layer. The pleatable backer layers differed in the weight percentage of fine and coarse diameter fibers that were used and the surface average fiber diameter. The dust holding capacity was the highest for filter media having a surface average fiber diameter of between 13 microns and 17 microns. FIG. 2 shows the dust holding capacity versus surface average fiber diameter for the filter media in Example 1.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media, comprising:
a non-woven web comprising:
first synthetic fibers having an average fiber diameter of greater than or equal to about 15 microns, wherein the weight percentage of first synthetic fibers of all fibers in the non-woven web is greater than or equal to about 30 wt. %; and
second synthetic fibers having an average fiber diameter of greater than or equal to about 0.5 microns and less than about 15 microns, wherein the weight percentage of second synthetic fibers of all fibers in the non-woven web is less than or equal to about 50 wt. %,
wherein the total weight percentage of binder in the non-woven web is greater than or equal to about 5 wt. % and less than or equal to about 40 wt. %,
wherein the surface average fiber diameter (SAFD) of the non-woven web is less than or equal to about 17 microns and is measured using the formula:

$$SAFD[\text{in microns}] = 4 \bigg/ \left( SSA \ \rho \left[ \text{in} \frac{\text{g}}{\text{cm3}} \right] \right)$$

wherein SSA is the BET surface area of the non-woven web in m²/g and ρ is the density of the non-woven web in g/cm³, and wherein the basis weight of the non-woven web is less than or equal to about 110 g/m²; and
an efficiency layer.

2. A filter media, comprising:
a non-woven web comprising:
first synthetic fibers having an average fiber diameter of greater than or equal to about 15 microns, wherein the weight percentage of first synthetic fibers of all fibers in the non-woven web is greater than or equal to about 30 wt. %; and
second synthetic fibers having an average fiber diameter of greater than or equal to about 0.5 microns and less than about 15 microns, wherein the weight percentage of second synthetic fibers of all fibers in the non-woven web is less than or equal to about 50 wt. %,
wherein the total weight percentage of binder in the non-woven web is greater than or equal to about 5 wt. % and less than or equal to about 40 wt. %,
wherein the surface average fiber diameter (SAFD) of the non-woven web is less than or equal to about 17 microns and is measured using the formula:

$$SAFD[\text{in microns}] = 4 \Big/ \left(SSA\rho\left[\text{in }\frac{g}{cm3}\right]\right)$$

wherein SSA is the BET surface area of the non-woven web in m²/g and ρ is the density of the non-woven web in g/cm³, and
an efficiency layer,
wherein the filter media has a dust holding capacity of greater than or equal to about 20 g/m².

3. A wetlaid non-woven web, comprising:
first synthetic fibers having an average fiber diameter of greater than or equal to about 15 microns, wherein the weight percentage of first synthetic fibers of all fibers in the wetlaid non-woven web is greater than or equal to about 30 wt. %; and
second synthetic fibers having an average fiber diameter of greater than or equal to about 0.5 microns and less than about 15 microns, wherein the weight percentage of second synthetic fibers of all fibers in the wetlaid non-woven web is less than or equal to about 50 wt. %,
wherein the total weight percentage of binder in the wetlaid non-woven web is greater than or equal to about 5 wt. % and less than or equal to about 40 wt. %,
wherein the surface average fiber diameter (SAFD) of the wetlaid non-woven web is less than or equal to about 17 microns and is measured using the formula:

$$SAFD[\text{in microns}] = 4 \Big/ \left(SSA\rho\left[\text{in }\frac{g}{cm3}\right]\right)$$

wherein SSA is the BET surface area of the wetlaid non-woven web in m²/g and ρ is the density of the wetlaid non-woven web in g/cm³.

4. The wetlaid non-woven web of claim 3, wherein the SAFD of the wetlaid non-woven web is greater than or equal to about 10 microns.

5. The wetlaid non-woven web of claim 3, wherein the first synthetic fibers comprise a first population of fibers and a second population of fibers and/or the second synthetic fibers comprise a third population of fibers and a fourth population of fibers.

6. The wetlaid non-woven web of claim 5, wherein the first population of fibers has an average fiber diameter of greater than or equal to about 15 microns and less than or equal to about 25 microns and/or the second population of fibers has an average fiber diameter of greater than or equal to about 25 microns and less than or equal to about 50 microns.

7. The wetlaid non-woven web of claim 5, wherein the third population of fibers has an average fiber diameter of greater than or equal to about 0.1 microns and less than or equal to about 10 microns and/or the fourth population of fibers has an average fiber diameter of greater than or equal to about 10 microns and less than about 15 microns.

8. The wetlaid non-woven web of claim 3, wherein the first synthetic fibers have an average fiber diameter of greater than or equal to about 15 microns and less than or equal to about 60 microns.

9. The wetlaid non-woven web of claim 3, wherein the second synthetic fibers have an average fiber diameter of greater than or equal to about 2 microns and less than or equal to about 10 microns.

10. The wetlaid non-woven web of claim 3, wherein the first synthetic fibers and/or the second synthetic fibers comprise flame retardant fibers.

11. The wetlaid non-woven web of claim 3, wherein the wetlaid non-woven web comprises greater than or equal to about 10 wt. % and less than or equal to about 30 wt. % of binder resin.

12. The wetlaid non-woven web of claim 3, wherein the basis weight of the wetlaid non-woven web is greater than or equal to about 20 g/m² and less than or equal to about 110 g/m².

13. The wetlaid non-woven web of claim 3, wherein the thickness of the wetlaid non-woven web is greater than or equal to about 0.25 mm and less than or equal to about 2.0 mm.

14. The wetlaid non-woven web of claim 3, wherein the air permeability of the wetlaid non-woven web is greater than or equal to about 50 CFM and less than or equal to about 800 CFM.

15. The wetlaid non-woven web of claim 3, wherein the dry tensile strength in the cross direction of the wetlaid non-woven web is greater than or equal to about 6 lb/in and less than or equal to about 20 lb/in.

16. The wetlaid non-woven web of claim 3, wherein the dry Gurley stiffness in the machine direction of the wetlaid non-woven web is greater than or equal to about 200 mg and less than or equal to about 3,500 mg.

17. The wetlaid non-woven web of claim 3, wherein the dry Gurley stiffness in the cross direction of the wetlaid non-woven web is greater than or equal to about 50 mg and less than or equal to about 1,500 mg.

18. The wetlaid non-woven web of claim 3, wherein the air permeability of the wetlaid non-woven web is greater than or equal to about 300 CFM.

19. The wetlaid non-woven web of claim 3, wherein the thickness of the wetlaid non-woven web is greater than or equal to about 0.25 mm and less than or equal to about 0.7 mm.

20. A filter media comprising the wetlaid non-woven web of claim 3 and an efficiency layer.

* * * * *